US012613947B2

(12) United States Patent
Kitamura

(10) Patent No.: US 12,613,947 B2
(45) Date of Patent: Apr. 28, 2026

(54) DUAL AUTHENTICATION PROCESS

(71) Applicant: Takashi Kitamura, Kanagawa (JP)

(72) Inventor: Takashi Kitamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 188 days.

(21) Appl. No.: 18/522,883

(22) Filed: Nov. 29, 2023

(65) Prior Publication Data

US 2024/0202302 A1 Jun. 20, 2024

(30) Foreign Application Priority Data

Dec. 16, 2022 (JP) ................................. 2022-201075

(51) Int. Cl.
| | |
|---|---|
| *G06F 21/32* | (2013.01) |
| *G06F 3/12* | (2006.01) |
| *G06V 40/16* | (2022.01) |

(52) U.S. Cl.
CPC ............ *G06F 21/32* (2013.01); *G06F 3/1222* (2013.01); *G06F 3/1238* (2013.01); *G06F 3/1284* (2013.01); *G06V 40/172* (2022.01)

(58) Field of Classification Search
CPC ..... G06V 40/172; G06F 21/32; G06F 3/1222; G06F 3/1238; G06F 3/1284
See application file for complete search history.

(56) References Cited

U.S. PATENT DOCUMENTS

| | | | | |
|---|---|---|---|---|
| 2015/0347067 A1* | 12/2015 | Levine | .................... | G06F 21/60 |
| | | | | 358/1.15 |
| 2016/0337335 A1 | 11/2016 | Satoh et al. | | |
| 2022/0067895 A1* | 3/2022 | Maeda | .................... | G06Q 20/18 |
| 2022/0137904 A1 | 5/2022 | Kitamura | | |
| 2022/0147612 A1* | 5/2022 | Ozono | ............. | G06Q 20/40145 |

(Continued)

FOREIGN PATENT DOCUMENTS

| | | |
|---|---|---|
| JP | 2016-212654 A | 12/2016 |
| JP | 2016-218672 A | 12/2016 |
| JP | 2020-197849 A | 12/2020 |

(Continued)

*Primary Examiner* — Mohamed A. Wasel
(74) *Attorney, Agent, or Firm* — IPUSA, PLLC

(57) ABSTRACT

An information processing system includes circuitry. The circuitry collates authentication target face information with registered face information to generate a collation result. The authentication target face information is acquired by reading face information of a person to be authenticated. The registered face information has been registered in advance in association with user identification information. When multiple pieces of user identification information are found based on the collation result indicating multiple pieces of registered face information satisfying a predetermined authentication condition, the multiple pieces of user identification information of the user identification information being associated with the multiple pieces of registered face information, the circuitry requests entry of an at least partial password and authenticates the person to be authenticated, based on entered password information and multiple pieces of password registration information, which are stored in association with the multiple pieces of user identification information.

18 Claims, 13 Drawing Sheets

(56)         References Cited

U.S. PATENT DOCUMENTS

2022/0408259  A1*  12/2022  Adel  ................. H04W 12/0431
2023/0083109  A1     3/2023  Kitamura

FOREIGN PATENT DOCUMENTS

JP          2020-201595  A     12/2020
JP          2022-509469  A      1/2022
JP          2022-049024  A      3/2022
WO          2001/009807  A1     2/2001
WO          2001/088785  A1    11/2001
WO          2020/091272  A1     5/2020

* cited by examiner

FIG. 5

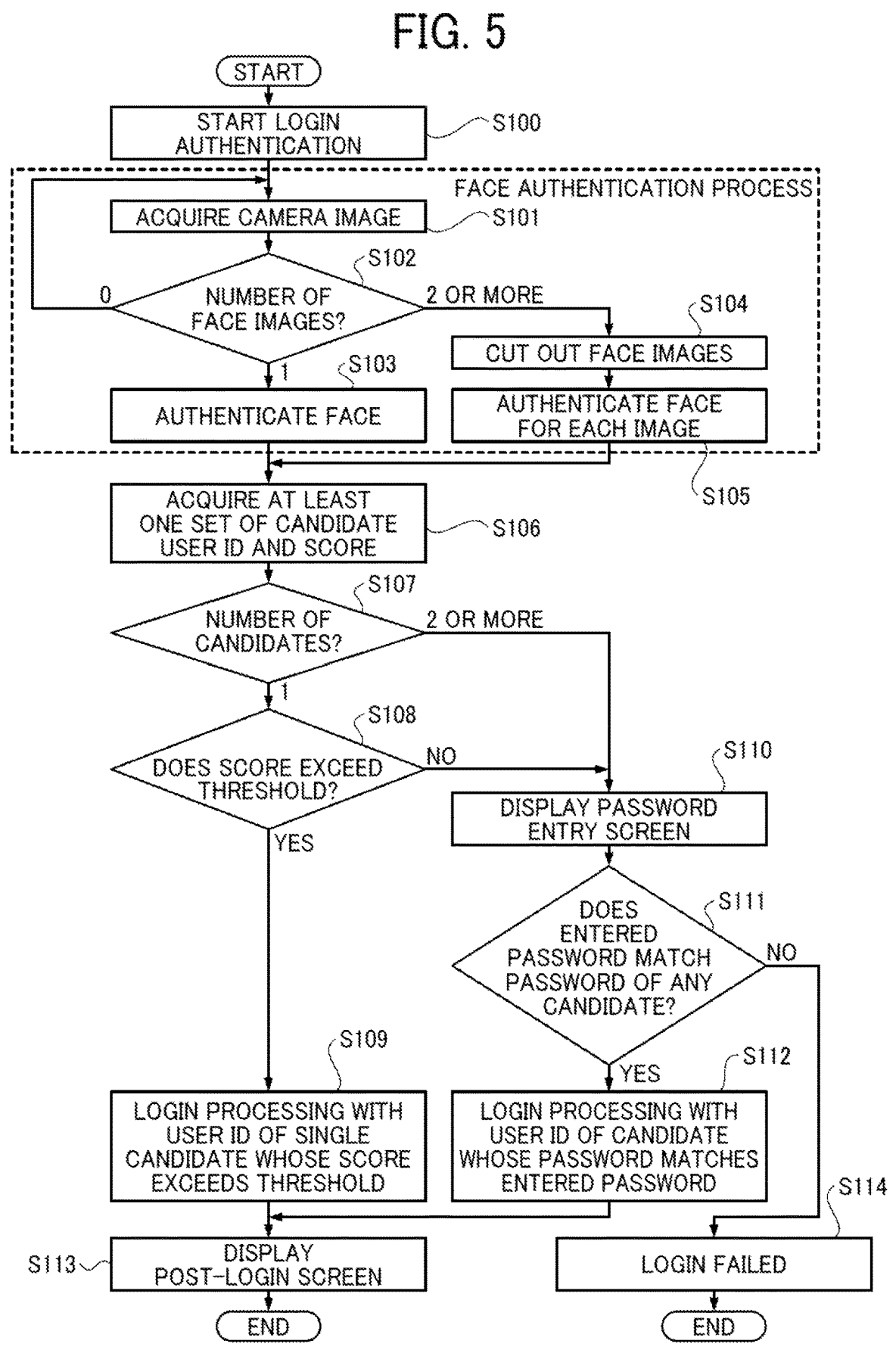

START

START LOGIN
AUTHENTICATION ～S100

FACE AUTHENTICATION PROCESS

ACQUIRE CAMERA IMAGE ～S101

S102
NUMBER OF
FACE IMAGES?

0 ——→ (back to ACQUIRE CAMERA IMAGE)

2 OR MORE

S104
CUT OUT FACE IMAGES

1 ～S103
AUTHENTICATE FACE

AUTHENTICATE FACE
FOR EACH IMAGE

～S105

ACQUIRE AT LEAST
ONE SET OF CANDIDATE
USER ID AND SCORE ～S106

S107
NUMBER OF
CANDIDATES?

2 OR MORE

1

S108
DOES SCORE EXCEED
THRESHOLD?

NO

S110
DISPLAY PASSWORD
ENTRY SCREEN

YES

S111
DOES
ENTERED
PASSWORD MATCH
PASSWORD OF ANY
CANDIDATE?

NO

S109
LOGIN PROCESSING WITH
USER ID OF SINGLE
CANDIDATE WHOSE SCORE
EXCEEDS THRESHOLD

YES

S112
LOGIN PROCESSING WITH
USER ID OF CANDIDATE
WHOSE PASSWORD MATCHES
ENTERED PASSWORD

S114

S113～ DISPLAY
POST-LOGIN SCREEN

LOGIN FAILED

END

END

FIG. 8A

| FACE ID | USER ID | PASSWORD |
|---|---|---|
| aaaaaaaaaaaaaaaaaaa | usera | 12345678 |
| bbbbbbbbbbbbbbbbbbb | userb | 02345678 |
| ccccccccccccccccccc | userc | 12341234 |
| ddddddddddddddddddd | userd | 1234567890 |
| . . . | . . . | . . . |

FIG. 8B

| GROUP ID | GROUP OF CANDIDATES |
|---|---|
| 0001 | (usera, userc, userd) |
| 0002 | (userb, userf) |
| 0003 | (userc, usere, userg, userh) |
| . . . | . . . |

FIG. 12

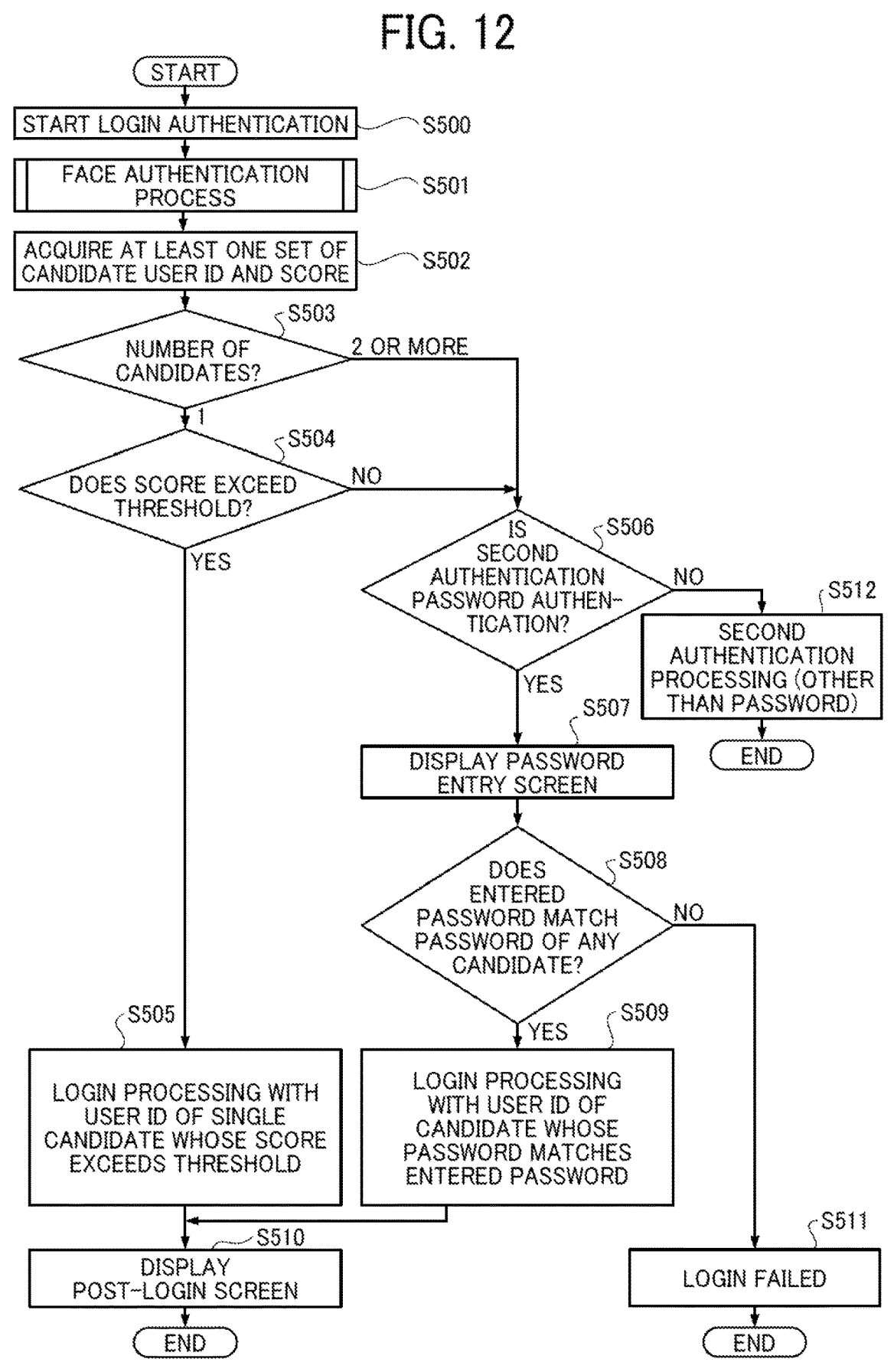

START

START LOGIN AUTHENTICATION — S500

FACE AUTHENTICATION PROCESS — S501

ACQUIRE AT LEAST ONE SET OF CANDIDATE USER ID AND SCORE — S502

S503 — NUMBER OF CANDIDATES? — 2 OR MORE

1

S504 — DOES SCORE EXCEED THRESHOLD? — NO

YES

S506 — IS SECOND AUTHENTICATION PASSWORD AUTHENTICATION? — NO — S512 — SECOND AUTHENTICATION PROCESSING (OTHER THAN PASSWORD) — END

YES

S507 — DISPLAY PASSWORD ENTRY SCREEN

S508 — DOES ENTERED PASSWORD MATCH PASSWORD OF ANY CANDIDATE? — NO

YES

S505 — LOGIN PROCESSING WITH USER ID OF SINGLE CANDIDATE WHOSE SCORE EXCEEDS THRESHOLD

S509 — LOGIN PROCESSING WITH USER ID OF CANDIDATE WHOSE PASSWORD MATCHES ENTERED PASSWORD

S510 — DISPLAY POST-LOGIN SCREEN

END

S511 — LOGIN FAILED

END

500

FACE AUTHENTICATION
SERVER 550

FACE INFOR-
MATION STOR-
AGE DEVICE　～552

NETWORK　～502

510a

520a

510b

520b

510c

520c

DUAL AUTHENTICATION PROCESS

CROSS-REFERENCE TO RELATED APPLICATION

This patent application is based on and claims priority pursuant to 35 U.S.C. § 119(a) to Japanese Patent Application No. 2022-201075, filed on Dec. 16, 2022, in the Japan Patent Office, the entire disclosure of which is hereby incorporated by reference herein.

BACKGROUND

Technical Field

Embodiments of the present disclosure generally related to an authentication processing technology, and more particularly, to an information processing system, an information processing apparatus, an image forming apparatus, an authenticating method, and a non-transitory recording medium for authentication processing.

Related Art

Information processing apparatuses such as multifunction peripherals have been developed with a user authentication function including a face authentication function.

SUMMARY

According to an embodiment of the present disclosure, an information processing system includes circuitry. The circuitry collates authentication target face information with registered face information to generate a collation result. The authentication target face information is acquired by reading face information of a person to be authenticated. The registered face information has been registered in advance in association with user identification information. In a case where a plurality of pieces of user identification information are found based on the collation result indicating a plurality of pieces of registered face information satisfying a predetermined authentication condition, the plurality of pieces of user identification information of the user identification information being associated with the plurality of pieces of registered face information of the registered face information, the circuitry requests entry of an at least partial password and authenticates the person to be authenticated, based on entered password information and a plurality of pieces of password registration information. The plurality of pieces of password registration information is stored in association with the found plurality of pieces of user identification information.

According to an embodiment of the present disclosure, an information processing apparatus includes circuitry. The circuitry acquires a result of collation between authentication target face information and registered face information. The authentication target face information is acquired by reading face information of a person to be authenticated. The registered face information has been registered in advance in association with user identification information. In a case where a plurality of pieces of user identification information are found based on the result of collation indicating a plurality of pieces of registered face information satisfying a predetermined authentication condition, the plurality of pieces of user identification information of the user identification information being associated with the plurality of pieces of registered face information of the registered face information, the circuitry requests entry of an at least partial password and authenticates the person to be authenticated, based on entered password information and a plurality of pieces of password registration information. The plurality of pieces of password registration information is stored in association with the found plurality of pieces of user identification information.

According to an embodiment of the present disclosure, an image forming apparatus includes the information processing apparatus. The circuitry further provides at least one function related to an image and authenticates the person to be authenticated as login processing for use of the at least one function.

According to an embodiment of the present disclosure, an authenticating method includes collating, requesting, and authenticating. The collating being collating authentication target face information with registered face information to generate a collation result. The authentication target face information is acquired by reading face information of a person to be authenticated. The registered face information has been registered in advance in association with user identification information. In a case where a plurality of pieces of user identification information are found based on the collation result indicating a plurality of pieces of registered face information satisfying a predetermined authentication condition, the plurality of pieces of user identification information of the user identification information being associated with the plurality of pieces of registered face information of the registered face information, the requesting, as the requesting, entry of an at least partial password and authenticating, as the authenticating, the person to be authenticated, based on entered password information and a plurality of pieces of password registration information. The plurality of pieces of password registration information is stored in association with the plurality of pieces of user identification information.

According to an embodiment of the present disclosure, a non-transitory recording medium storing a plurality of instructions which, when executed by one or more processors, causes the one or more processors to perform the authenticating method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a flowchart illustrating an authentication method executed in a login authentication system according to a first embodiment of the present disclosure;

FIG. 8A is a diagram illustrating a data structure of a table that may be referenced in one or more embodiments of the present disclosure;

FIG. 8B is a diagram illustrating a data structure of a table that may be referenced in the second embodiment of the present disclosure;

FIG. 12 is a flowchart illustrating an authentication method executed in a login authentication system according to a fifth embodiment of the present disclosure.

Figure 1:
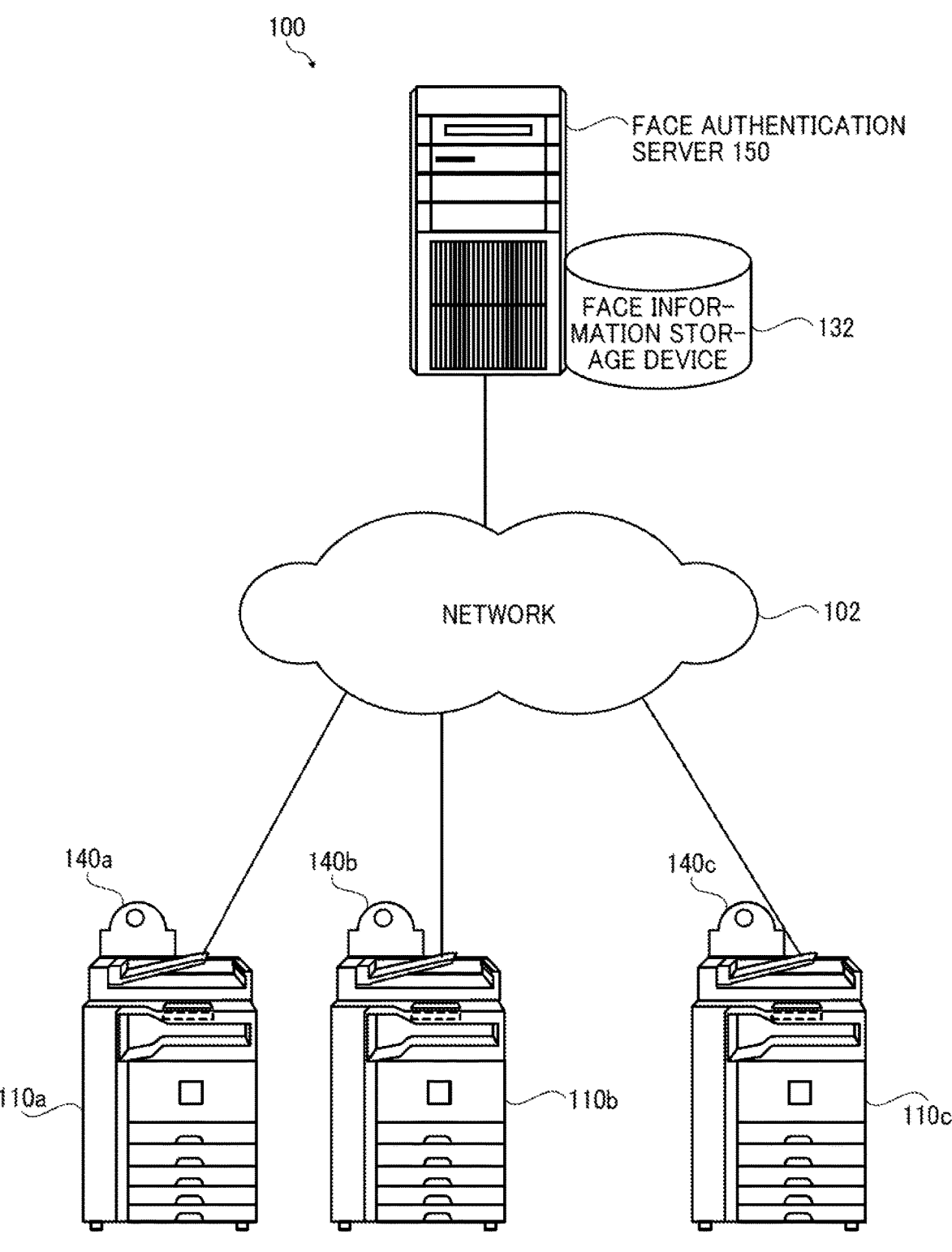
FIG. 1 is a schematic diagram of a login authentication system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present disclosure are described below.

As used herein, the singular forms "a," "an," and "the" are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

As used herein, the term "connected/coupled" includes both direct connections and connections in which there are one or more intermediate connecting elements.

According to the present disclosure, an information processing system is provided that authenticates a person when causing the person to use a predetermined function. Specifically, the information processing system includes a collation unit that collates authentication target face information with registered face information. The authentication target face information is acquired by reading face information of a person to be authenticated. The registered face information is face information having been registered in advance in association with user identification information. The information processing system further includes a requesting unit and an authentication unit. When a plurality of pieces of user identification information associated with a plurality of pieces of registered face information satisfying a predetermined authentication condition are found as a result of collation by the collation unit, the requesting unit requests at least partial password entry (entry of an entire password or entry of a partial password, that is, a part of the entire password). The authentication unit authenticates the person to be authenticated, based on entered password information and a plurality of pieces of password registration information, which is stored in association with the found pieces of user identification information.

The predetermined authentication condition may be satisfied when the degree of coincidence between the authentication target face information and the registered face information exceeds a predetermined threshold.

In one embodiment of the present disclosure, the predetermined threshold may be a threshold for determining the user identification information corresponding to the registered face information coincident with the authentication target face information by a degree exceeding the threshold, as a candidate of corresponding user identification information corresponding to the person to be authenticated.

In another embodiment of the present disclosure, the predetermined threshold may be a threshold for determining that authentication is successful with the user identification information corresponding to the registered face information coincident with the authentication target face information by a degree exceeding the threshold, as corresponding user identification information corresponding to the person to be authenticated.

In one or more embodiments of the present disclosure, the authentication unit may identify, based on the entered password information and the pieces of password registration information, single user identification information of the plurality of pieces of user identification information as corresponding user identification information corresponding to the person to be authenticated and determine whether to authenticate with the identified corresponding user identification information, based on the entered password information.

When, as a result of collation by the collation unit, the single user identification information as corresponding user identification information corresponding to the person to be authenticated is identified and the degree of coincidence between the authentication target face information and single registered face information corresponding to the single user identification information exceeds a threshold for determining that the authentication is successful, the authentication with the corresponding user identification information is successfully completed.

On the other hand, when, as a result of collation by the collation unit, the single user identification information as corresponding user identification information corresponding to the person to be authenticated is identified and the degree of coincidence between the authentication target face information and single registered face information corresponding to the single user identification information does not exceed the threshold for determining that the authentication is successful, the requesting unit may request the at least partial password entry and the authentication unit may determine whether to authenticate with the single user identification information, based on the entered password information.

In one or more embodiments of the present disclosure, the request for the at least partial password entry may be a request for entry of a partial password (a part of a password) or a request for entry of an entire password.

In a preferred embodiment of the present disclosure, it may be determined depending on conditions whether to request entry of a partial password or to request entry of an entire password.

In a specific embodiment of the present disclosure, entry of a partial password may be requested when a predetermined number of characters up to a first nonoverlapping character in a comparison of characters of the password registration information between the pieces of password registration information character by character from the beginning (i.e., a minimum number of characters required to specify any one of a plurality of passwords) is equal to or less than a predefined threshold number of characters (e.g., a minimum number of characters required for a password for authentication at the time of registration). By contrast, when the predetermined number of characters is greater than the threshold number of characters, entry of an entire password may be requested. In the request for the entry of the partial password, the partial password includes at least the predetermined number of characters from the beginning (i.e., the shortest character string for specifying any one of a plurality of passwords). In other words, the partial password requested to be entered may be the shortest character string or a character string longer than the shortest character string and shorter than the entire password.

When the requesting unit requests the entry of the partial password and the authentication fails due to an error found in the entered password information, the found pieces of user identification information are stored as an authentication failure group, of which authentication with the entry of the partial password may be restricted until authentication with the entry of the entire password succeeds at least once.

When a plurality of pieces of user identification information associated with a plurality of pieces of registered face information satisfying the predetermined authentication condition are found as a result of collation by the collation unit, the authentication unit may temporarily authenticate the person to be authenticated as a guest user. In this case, the requesting unit defers requesting the at least partial password entry and the authentication unit defers authenticating the person to be authenticated until an operation limited to a specific user occurs. In other words, when the operation that is not allowed for a guest user and is limited to the specific user occurs, the requesting unit requests the at least partial password entry and the authentication unit authenticates the person to be authenticated. Thus, the user (the person) is required to log in as a specific user instead of a guest user.

In a preferred embodiment of the present disclosure, the information processing system may further include an enabling unit and an association setting unit. When authentication is not successful by the collation alone by the collation unit, the enabling unit receives setting as to whether to enable alternative authentication. The association setting unit receives association of an authentication scheme used in alternative authentication with a range of degrees of coincidence between the authentication target face information and the registered face information. In this case, the at least partial password entry corresponds to one of the authentication schemes used in the alternative authentication. The predetermined authentication condition described above indicates that the password entry is within the associated range of degrees of coincidence.

In a specific embodiment of the present disclosure, the requesting unit may present the found pieces of user identification information when requesting the at least partial password entry.

In one or more embodiments of the present disclosure, the authentication target face information, which is acquired by reading the face information of the person to be authenticated, may be acquired, via a terminal apparatus capable of communicating with the collation unit through a network, from an imaging unit included in a terminal apparatus (for example, a multifunction peripheral or a smart door terminal) to be approached by the person to be authenticated at the time of authentication or an imaging device connected to the terminal apparatus to be approached by the person to be authenticated at the time of authentication. Alternatively, the authentication target face information may be acquired from an imaging device that is associated with a terminal apparatus to be approached by the person to be authenticated at the time of authentication and is capable of communicating with the collation unit through a network.

In one or more embodiments of the present disclosure, the collation unit may be included in a terminal apparatus (for example, a multifunction peripheral or a smart door terminal) to be approached by the person to be authenticated at the time of authentication or may be included in a remote device (for example, a face authentication server) connectable to the terminal apparatus via a network. For example, the request for the at least partial password entry may be displayed on a display included in a terminal apparatus to be approached by the person to be authenticated at the time of authentication or may be output as sound from a speaker included in the terminal apparatus. When the request for the at least partial password entry is displayed, for example, a message requesting to enter the password may be displayed or a user interface (UI) for entry of the password may be simply displayed. The entry of the password information may be received via an input device such as a hardware keyboard or a touch panel (for example, a software keyboard) included in the terminal apparatus.

In a specific embodiment of the present disclosure, the above-described authentication of the person to be authenticated may be login processing to log in to an image forming apparatus that provides at least one function related to images, to allow the person to use the at least one function. Alternatively, in another embodiment of the present disclosure, the above-described authentication of the person to be authenticated may be authentication processing for opening and closing an entrance through which the person enters and exits (for example, unlocking and locking or opening and closing of an automatic door).

According to the present disclosure, an information processing apparatus (terminal apparatus) included in the information processing system, an authentication method executed by the information processing system, and a non-transitory recording medium storing multiple instructions which, when executed by one or more processors, causes the one or more processors to perform the authentication method are further provided.

Referring to the drawings, a detailed description is given below of an authentication system for login authentication for use of a multifunction peripheral according to the present embodiment. However, the information processing system according to the present embodiment is not limited to the login authentication system of the multifunction peripheral.

FIG. 1 is a schematic diagram of a login authentication system 100 according to the present embodiment.

As illustrated in FIG. 1, the login authentication system 100 includes three multifunction peripherals (MFPs) 110*a* to 110*c* as information processing apparatuses to which operators log in, three cameras 140*a* to 140*c* as imaging units or imaging devices that capture the faces of the operators for face authentication, and a face authentication server 150 that executes the face authentication.

The MFPs 110*a* to 110*c* are connected to the face authentication server 150 via a network 102. The MFPs 110 (110*a* to 110*c*) support login by face authentication and communicate with the face authentication server 150 at the time of face authentication. According to the present embodiment, each of the MFPs 110 is a terminal apparatus to be approached and operated by a person to be authenticated at the time of authentication and serves as an information processing apparatus that provides a function that the person to be authenticated intends to use.

The cameras 140*a* to 140*c* are used for face authentication for login to the MFPs 110*a* to 110*c*, respectively. The cameras 140*a* to 140*c* may be connected to the MFPs 110*a* to 110*c*, respectively, through wired communication with a universal serial bus (USB) or wireless communication with WI-FI or BLUETOOTH. Alternatively, the cameras 140*a* to 140*c* may be built in the MFPs 110*a* to 110*c*, respectively. Alternatively, the cameras 140 (140*a* to 140*c*) connected to the network 102 may be connected to the face authentication server 150 via the network 102. When the cameras 140 are connected to the network 102, the cameras 140 may be preferably managed in association with the corresponding MFPs 110. In other words, which one of the cameras 140 is used at the time of login to which one of the MFPs 110 is determined by the connection relation between the cameras 140 and the MFPs 110 or managed by the correspondence relation registered in advance.

The face authentication server 150 includes a face information storage device 132 that stores face information (face images or face feature information) of a plurality of users registered in advance. In response to a face authentication request from the outside (for example, the MFP 110), the face authentication server 150 compares and collates the face information of an authentication target related to the request, with each piece of face information registered in advance. The face authentication server 150 transmits the result of collation of the face information as a response to the request. As described above, the face information of the authentication target is acquired from the camera 140 associated with the request source. The face authentication server 150 may be deployed on-premises on a network in an organization or may be provided off-premises by, for example, a cloud service.

The network 102 may be any desired network. The network 102 is typically a network (a local area network or a network in which local area networks of a plurality of bases are connected through a dedicated line or a virtual private network (VPN)) in a predetermined organization such as a government office, a company, or an educational institution. Alternatively, the network 102 may include a public network such as the Internet.

Although FIG. 1 illustrates the three MFPs 110*a* to 110*c* and the three cameras 140*a* to 140*c*, the number of MFPs 110 and the number of cameras 140 are not particularly limited, and may be one, two, or four or more. Although the MFPs 110 and the cameras 140 are typically associated with each other on a one-to-one basis in the description, the association between the MFPs 110 and the cameras 140 is not limited to the association on the one-to-one basis. For example, a single camera may be used for the face authentication at the time of login to the MFPs 110 with the monitoring range divided into a plurality of areas.

Before the face authentication processing of the present embodiment is described in detail, a description is given below of the hardware configuration of the components of the login authentication system 100.

Figure 2A:
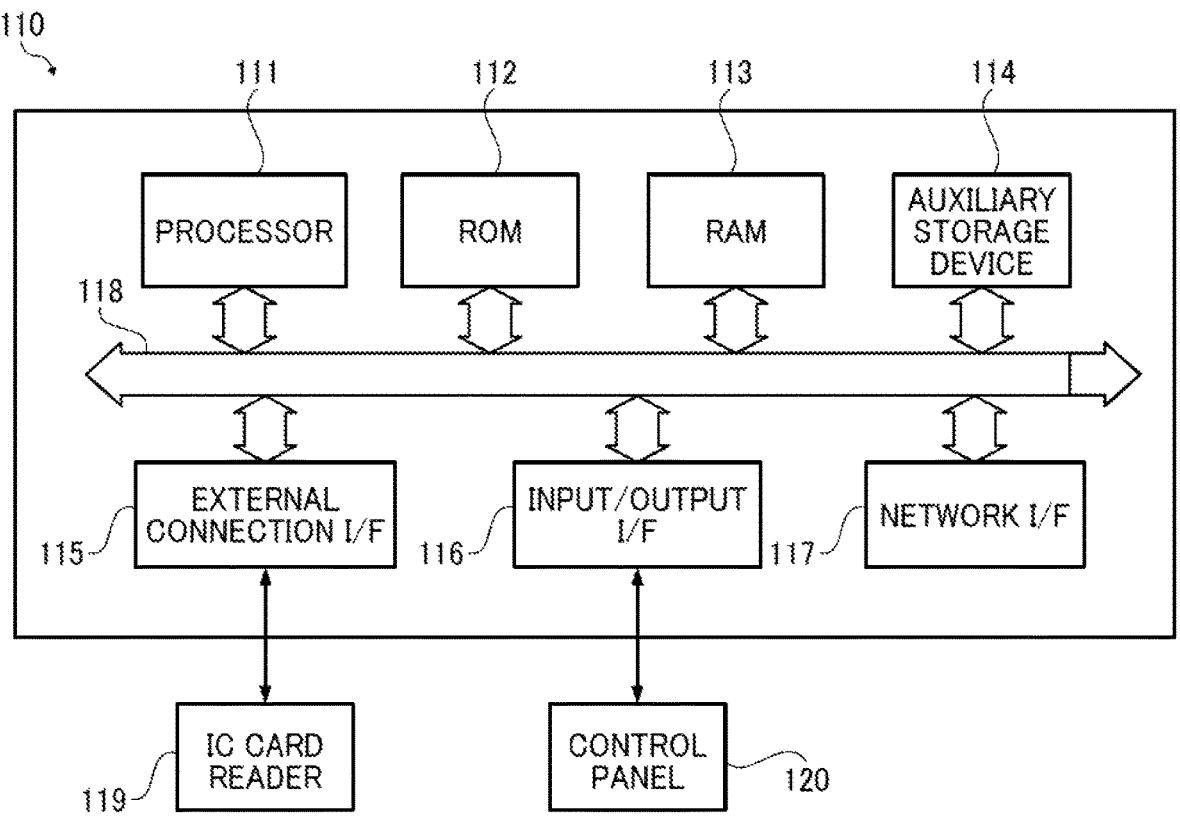
FIG. 2A is a diagram illustrating a hardware configuration of a multifunction peripheral of the login authentication system of FIG. 1.
Figure 2B:
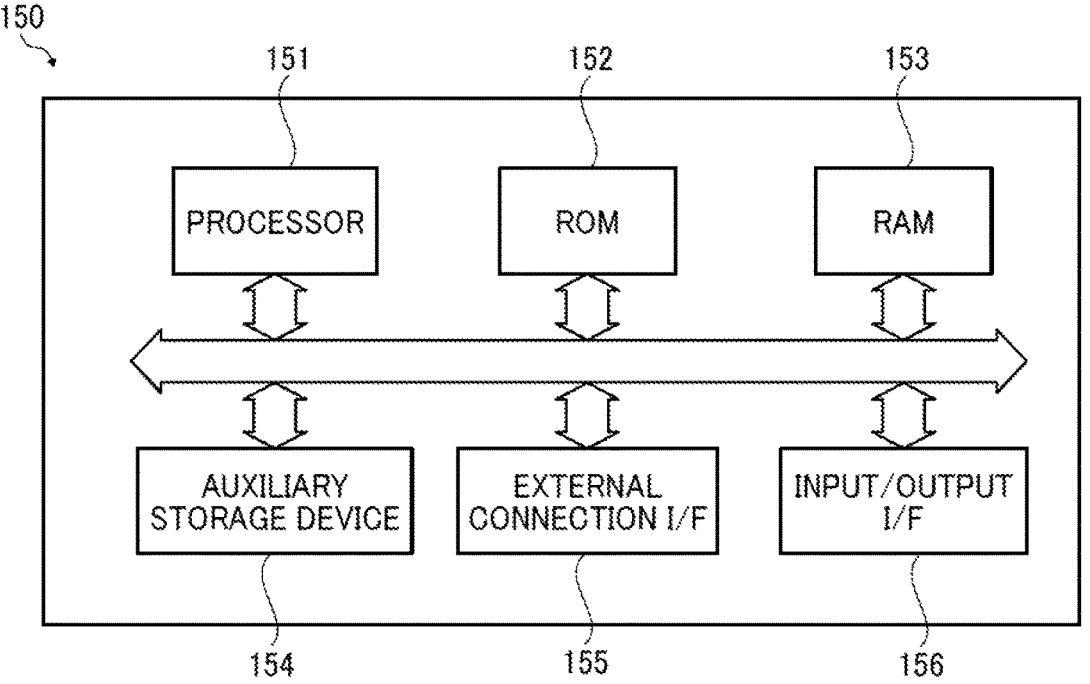
FIG. 2B is a diagram illustrating a hardware configuration of a face authentication server of the login authentication system of FIG. 1.

FIG. 2A illustrates a hardware configuration of the MFP 110 according to the present embodiment. FIG. 2B illustrates a hardware configuration of the face authentication server 150 according to the present embodiment.

As illustrated in FIG. 2A, a controller of the MFP 110 includes at least a processor 111, a read only memory (ROM) 112, a random access memory (RAM) 113, an auxiliary storage device 114, an external connection interface 115, an input/output interface 116, and a network interface 117. The processor 111 controls the operation of the entire apparatus. The ROM 112 stores, for example, a boot program and a firmware program. The RAM 113 provides an execution space for the processor 111 to execute a program. The auxiliary storage device 114 stores, for example, an operating system (OS) and various applications. The external connection interface 115 is an interface to which an external input/output device such as an integrated circuit (IC) card reader 119 is connected. The input/output interface 116 is an interface to which, for example, a control panel 120 is connected. The network interface 117 is an interface to connect the MFP 110 to the network 102. These components are connected to each other via a bus 118.

In the present embodiment, the processor 111 executes dedicated programs stored in the ROM 112 and the auxiliary storage device 114 in the execution space provided by the RAM 113, to implement the functions of the MFP 110 described later with reference to FIG. 3.

As illustrated in FIG. 2B, a computer of the face authentication server 150 includes at least a processor 151, a ROM 152, a RAM 153, an auxiliary storage device 154, an input/output interface 155, and a network interface 156. The processor 151 controls the operation of the entire apparatus. The ROM 152 stores, for example, a boot program and a firmware program. The RAM 153 provides an execution space for the processor 151 to execute a program. The auxiliary storage device 154 stores, for example, an OS and various applications. The input/output interface 155 is an interface to which, for example, a control panel or a display is connected. The network interface 156 is an interface that connects the face authentication server 150 to the network 102.

In the present embodiment, the processor 151 executes dedicated programs stored in the ROM 152 and the auxiliary storage device 154 in the execution space provided by the RAM 153, to implement the functions of the face authentication server 150 described later with reference to FIG. 3.

A description has been given of the overall configuration of the login authentication system 100 and the hardware configuration of the components of the login authentication system 100 according to the present embodiment.

Figure 3:
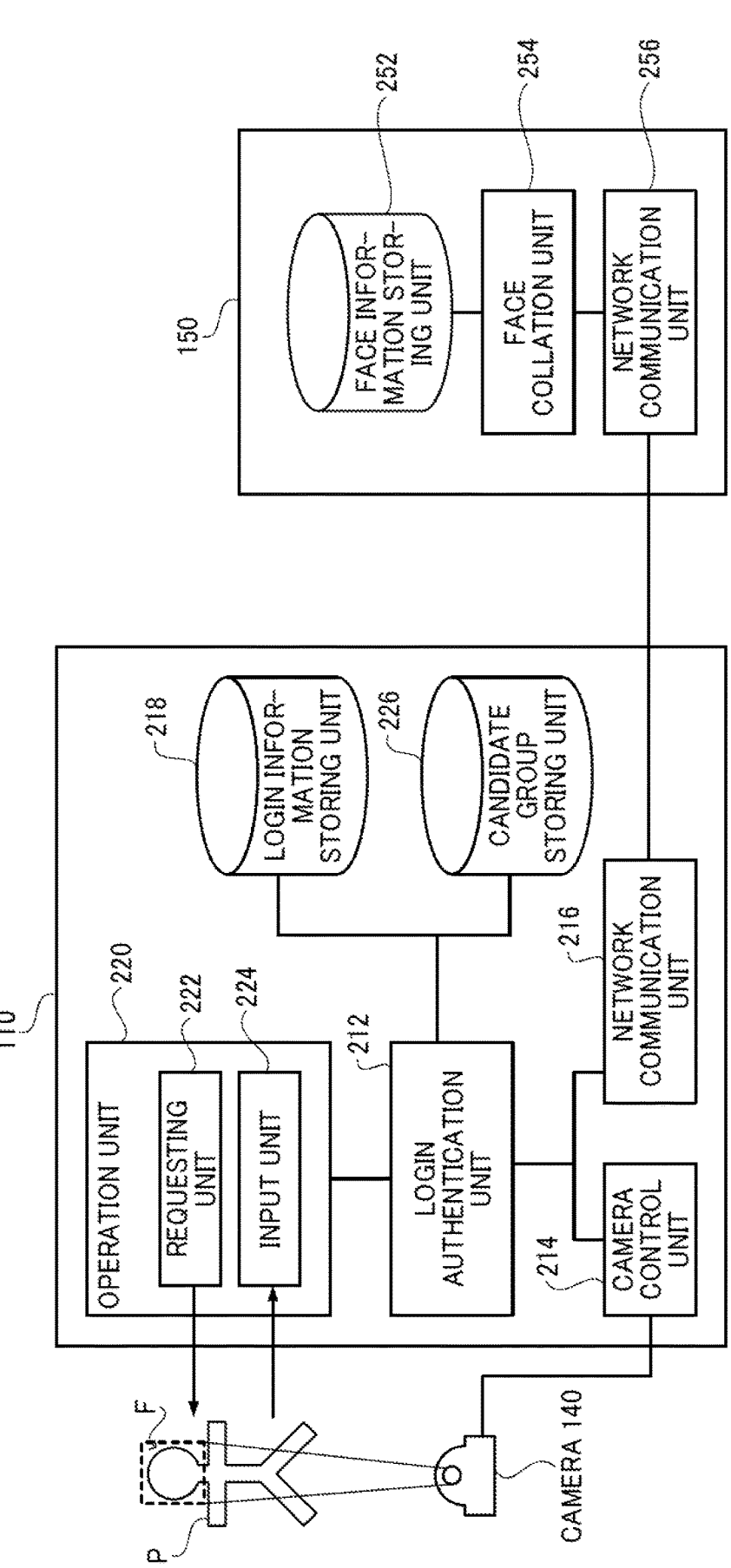
FIG. 3 is a functional block diagram of the login authentication system of FIG. 1.

Referring to FIG. 3, a description is given below of a functional configuration of the login authentication system 100 according to the present embodiment.

FIG. 3 illustrates a functional configuration of the MFP 110 and a functional configuration of the face authentication server 150 according to the present embodiment. FIG. 3 also schematically illustrates the camera 140, a person P to be authenticated, and a face F of the person P.

According to the present embodiment, the MFP 110 includes, as functional units, a login authentication unit 212, a camera control unit 214, a network communication unit 216, a login information storing unit 218, an operation unit 220, and a candidate group storing unit 226.

The login authentication unit 212 controls the entire login processing of the MFP 110.

The login authentication unit 212 also causes the operation unit 220 to display, for example, a login screen.

The login authentication unit 212 starts a login authentication process in response to the occurrence of an event that triggers the start of login processing. In the present embodiment, the login authentication process is performed by two steps. The main authentication scheme is face authentication. When the face authentication is insufficient, password authentication is performed as an alternative authentication scheme. A detailed description will be given later of a two-step login authentication process according to the present embodiment, with reference to FIG. 4. In the face authentication processing, the login authentication unit 212 communicates with the camera 140 and the face authentication server 150 via the camera control unit 214 and the network communication unit 216, respectively, to cooperate with the camera 140 and the face authentication server 150. The login authentication unit 212 serves as an authentication unit according to the present embodiment.

The camera control unit 214 controls the camera 140 that is used for face authentication. The camera control unit 214 reads the face F of the person P to be authenticated and acquires the authentication target face information, which is the information of the face F of the person P to be authenticated. In the following description, the face F of the person P to be authenticated may be referred to as face information F.

The network communication unit 216 is a processing unit to communicate with the face authentication server 150. The network communication unit 216 transmits a face authentication request to the face authentication server 150 together with the authentication target face information acquired by the camera control unit 214. The network communication unit 216 then receives a result of face authentication from the face authentication server 150. The network communication unit 216 serves as an acquiring unit according to the present embodiment.

The login information storing unit 218 stores information related to login. More specifically, the login information storing unit 218 stores password information in association with user identification information such as a user ID, an e-mail address, or an account name of each registered user. The login information storing unit 218 may also store face identification information for identifying face information registered in the face authentication server 150, in association with the user identification information of each registered user.

The candidate group storing unit 226 stores information on a group of candidates received from the face authentication server 150 as a result of face authentication.

The operation unit 220 receives an operation from an operator (the person P to be authenticated) who is subjected to login authentication in the login processing. As illustrated in FIG. 3, the operation unit 220 includes a requesting unit 222 and an input unit 224. The requesting unit 222 displays (outputs), for example, a message to the operator or a prompt for requesting input. The requesting unit 222 serves as a requesting unit according to the present embodiment. The input unit 224 receives input such as entry of password or selection from the operator.

With continued reference to FIG. 3, a description is given of the functional configuration of the face authentication server 150 according to the present embodiment.

The face authentication server 150 includes, as functional units, a face information storing unit 252, a face collation unit 254, and a network communication unit 256.

The face information storing unit 252, which is implemented by the face information storage device 132 illustrated in FIG. 1, stores a plurality of pieces of registered face information each being registered in advance in association with the user identification information such as a user ID, an e-mail address, or an account name. The registered face information is information to be collated with the input face information for evaluation of the degree of coincidence between the registered face information and the input face information. The degree of coincidence may be also referred to as, for example, a rate of coincidence or coincidence reliability. The user identification information such as the user ID may be directly or indirectly associated with the registered face information. When the user identification information is indirectly associated with the registered face information, for example, the face identification information uniquely assigned to the registered face information may be associated with the user identification information.

The face collation unit 254 executes the face authentication. The face collation unit 254 collates the authentication target face information, which is acquired by reading the face information F of the person P to be authenticated, with the pieces of registered face information, which are registered in advance in the face information storing unit 252, to generate a result of collation. The face collation unit 254 calculates a score for evaluating the degree of coincidence with the authentication target face information for each piece of registered face information. The result of collation of the face information may include the face identification information of all the pieces of registered face information registered in advance and a score indicating the degree of coincidence with each piece of registered face information. Alternatively, the result of collation of the face information may include the registered face information having a score exceeding a predetermined threshold and the corresponding score. Alternatively, the result of collation of the face information may include the registered face information having a score up to a predetermined top rank (for example, top 10) and the corresponding score. The face information storing unit 252 serves as a collation unit according to the present embodiment.

The network communication unit 256 is a processing unit for communicating with a request source of face authentication such as the MFP 110. The network communication unit 256 receives a face authentication request from the request source of the face authentication and the authentication target face information. The network communication unit 256 then transmits the face authentication request and the authentication target face information to the face collation unit 254. In response to the result of face authentication from the face collation unit 254, the network communication unit 256 transmits the result to the request source of the face authentication.

In the functional configuration illustrated in FIG. 3, the camera control unit 214 of the MFP 110 controls the camera 140 and acquires the face information F of the person P to be authenticated. The network communication unit 216 receives the face information F from the camera control unit 214 and transmits the face information F to the face authentication server 150. Alternatively, in another embodiment in which the camera 140 is not connected to the MFP 110 but is managed in association with the MFP 110, the camera 140 may detect the face F of the person P to be authenticated, acquire the face information F, and transmit a face authentication request related to the MFP 110 to the face authentication server 150 without passing through the MFP 110, so that the login authentication is started. In this case, the MFP 110 may start the login processing in response to a notification of the result of face authentication from the face authentication server 150.

Figure 4:
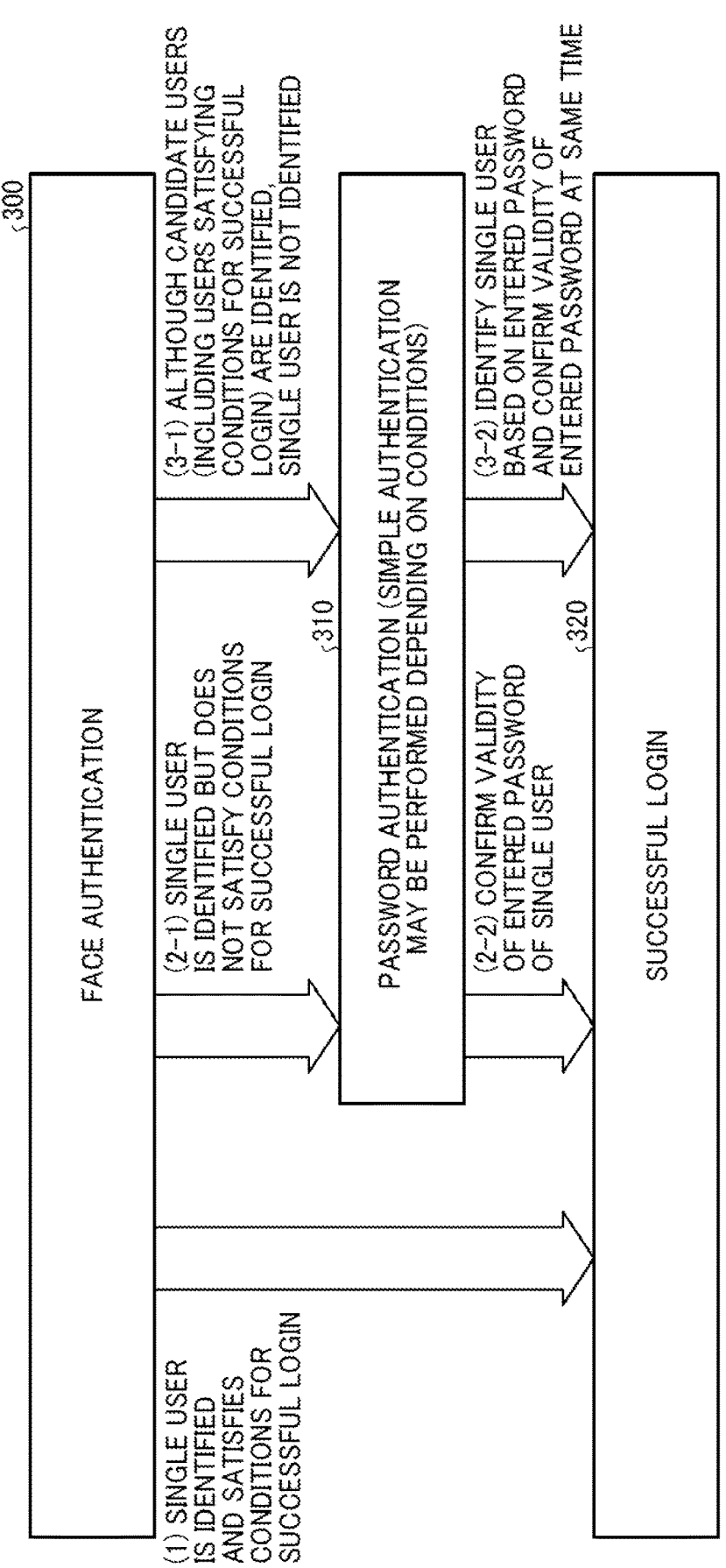
FIG. 4 is a diagram illustrating a two-step login authentication process according to an embodiment of the present disclosure.

Referring to FIG. 4, a detailed description is given below of the two-step login authentication process according to the present embodiment.

As described above, in the present embodiment, the login processing is performed by two steps. The main authentication scheme is face authentication 300. An alternative authentication scheme is password authentication 310. Since the password authentication 310 can use the result of collation in the face authentication 300 as will be described in detail later, the password authentication 310 may be performed in a simple manner in which only a part of a password is required to enter.

The login authentication unit 212 performs the face authentication 300. In the present embodiment, the face authentication 300 is performed in cooperation with the face authentication server 150. However, the face authentication 300 is not particularly limited to this way. In another embodiment of the present disclosure, the MFP 110 may have the function of the face authentication server 150 (in particular, the function of the face collation unit 254).

When the face authentication 300 results in a case (1) where the user identification information of the single user (corresponding user) corresponding to the person P to be authenticated is identified and the identified single user satisfies the conditions for successful login in the face authentication, the login authentication unit 212 determines, as a successful login 320, that the authentication is successfully completed. The conditions for successful login are satisfied when the above-described score exceeds a predetermined threshold for determining successful authentication (for example, a rate of coincidence >95%). The case (1) includes a case where the result of the above-described collation includes a single user alone as a candidate and the single candidate user satisfies the conditions for successful login. The case (1) also includes a case where the result of the above-described collation includes a plurality of users as candidates and a single user of the candidates satisfies the conditions for successful login. The result of the above-described collation may be a result obtained by further narrowing down the result with a threshold for specifying candidate users.

When the face authentication 300 results in a case (2-1) where the user identification information of the single corresponding user is identified but the identified single user does not satisfy the conditions for successful login in the face authentication or does not exceed the predetermined threshold, the login authentication unit 212 subsequently performs the password authentication 310. Although the password authentication 310 is completed in the MFP 110 in the present embodiment, the MFP 110 may cooperate with another authentication server in another embodiment of the present disclosure. The requesting unit 222 requests to enter the password. The input unit 224 receives the entry of the password. Based on the entered password information, the login authentication unit 212 determines whether authentication can be performed with the single corresponding user identification information identified. Accordingly, the validity of the entered password is confirmed for the single user (2-2). In this case, since the single user is identified in the face authentication 300, input of the user identification information such as a user ID or an e-mail address is unnecessary. This case includes a case where the result of the above-described collation includes the single user alone as a candidate and the candidate user does not satisfy the predetermined conditions for successful login.

When the face authentication 300 results in a case (3-1) where a plurality of user identification information corresponding to a plurality of candidate users (users satisfying a predetermined authentication condition to be left as candidates) are found but the single user is not identified, the login authentication unit 212 subsequently performs the password authentication 310. The requesting unit 222 requests to enter the password. The input unit 224 receives the entry of the password. The login authentication unit 212 authenticates the person to be authenticated, based on the entered password information and a plurality of pieces of password registration information stored in association with the found pieces of user identification information. At this time, the login authentication unit 212 identifies the single corresponding user identification information corresponding to the person P to be authenticated, based on the entered password information and the pieces of password registration information, and determines whether authentication can be performed with the identified corresponding user identification information. Accordingly, the single user is identified based on the entered password and the validity of the entered password is confirmed at the same time (3-2). In this case, since the users are narrowed down as a plurality of candidates by the face authentication 300 and the single user is identified by the association of the entered password with the user identification information, entry of the user identification information such as a user ID or an e-mail address is unnecessary.

The corresponding user identification information can be identified based on the entry of the password provided that the password is very unlikely to be the same between a plurality of users who may be candidates for the face authentication on the premise that identical passwords are forbidden between the users or that passwords need a predetermined strength. This case includes a case where the result of the above-described collation includes a plurality of users as candidates but none of the candidates satisfies the predetermined conditions for successful login or at least two of the candidates satisfy the predetermined conditions for successful login.

In a case where no candidate user satisfying the predetermined criterion or condition is found as a result of the face authentication (i.e., no user is identified), for example, the MFP 110 may request entry of both the user identification information and the password, the face authentication again, or authentication by another authentication scheme such as fingerprint authentication or ID card authentication.

Referring to FIGS. 5 to 12, a detailed description is given below of an authentication method according to the present embodiment.

FIG. 5 is a flowchart illustrating an authentication method executed in the login authentication system 100 according to a first embodiment of the present disclosure.

The process illustrated in FIG. 5 starts with step S100 in response to the occurrence of an event that triggers the start of the login processing. The event that triggers the start of the login processing may be, for example, receiving an explicit operation of requesting login by an operator or detecting (for example, by face recognition or with a human sensor or a thermal sensor) that a user directs the face to an image capturing range of the camera 140 in the standby state.

In step S101, the camera control unit 214 causes the camera 140 to capture the face F of the person P to be authenticated in the image capturing range to acquire a camera image. At this time, for example, the operator may be guided to turn the front of the face toward the camera 140 for login authentication.

In step S102, the camera control unit 214 identifies the number of face images in the acquired camera image. The flow is branched in step S102 based on the number of face images.

When the camera control unit 214 determines that no face image exists in the camera image (0 in step S102), the process returns to step S101 in which the camera control unit 214 attempts reacquisition of a camera image.

When the camera control unit 214 determines that a single face image exists in the camera image (1 in step S102), the process proceeds to step S103.

In step S103, the camera control unit 214 transmits, through the network communication unit 216, a request for face authentication together with the face image to the face authentication server 150. In response to the request, the face collation unit 254 of the face authentication server 150 performs the face authentication based on the face image.

When the camera control unit 214 determines that two or more face images exist in the camera image (2 OR MORE in step S102), the process proceeds to step S104.

In step S104, the camera control unit 214 cuts out a plurality of face images as preprocessing.

In step S105, the camera control unit 214 transmits, through the network communication unit 216, a request for face authentication together with the face images to the face authentication server 150. The face collation unit 254 performs the face authentication based on each of the face images.

In step S106, the login authentication unit 212 acquires, through the network communication unit 216, at least one set of user identification information (user ID) of a candidate and the corresponding score, as a result of the collation in step S103 or step S105.

In the present embodiment, the camera control unit 214 executes the operations of steps S101 to S105, whereas the login authentication unit 212 acquires the result of the collation in step S106.

As described above, in another embodiment in which the camera 140 is not connected to the MFP 110, the camera 140 may acquire detected face information and directly inquire of the face authentication server 150 about the face information. In this case, the face authentication server 150 transmits a result of face collation performed by the face collation unit 254 to the MFP 110 managed in association with the camera 140. The login authentication unit 212 of the MFP 110 acquires the result of face collation.

The flow is branched in step S107 based on the number of acquired candidates. In other words, in step S107, the login authentication unit 212 determines the number of candidates. The candidate is a user having a user ID with a score above a threshold for determining, as candidates, users having user IDs with scores above the threshold, to identify the user ID corresponding to the person P to be authenticated. The threshold is predefined and may be referred to as a candidate threshold in the following description. A set of user IDs with scores above the candidate threshold and corresponding scores may be obtained from the face authentication server 150. Alternatively, a subset of user IDs with scores above a candidate threshold higher than the aforementioned candidate threshold may be extracted from the set of user IDs received from the face authentication server 150. The candidate threshold may be set by a user or may be held by the system as a default.

When the login authentication unit 212 determines that the number of candidates is one (1 in step S107), the process proceeds to step S108.

In step S108, the login authentication unit 212 determines whether the score of the user ID of the candidate exceeds a threshold for determining that the authentication is successful. The threshold is predefined and may be referred to as an authentication threshold in the following description. The authentication threshold may be set by a user or may be held by the system as a default, provided that the authentication threshold is greater than the candidate threshold (for a greater degree of coincidence).

When the login authentication unit 212 determines that the score of the user ID of the candidate exceeds the authentication threshold (YES in step S108), the process proceeds to step S109.

In step S109, the login authentication unit 212 completes the login processing with the user ID of the single candidate whose score exceeds the authentication threshold.

Subsequently, in step S113, the operation unit 220 displays a post-login screen.

On the other hand, when the login authentication unit 212 determines that the number of candidates is two or more (2 OR MORE in step S107), or when the login authentication unit 212 determines that the score of the user ID of the candidate does not exceed the authentication threshold (NO in step S108), the process proceeds to step S110.

In step S110, the requesting unit 222 displays a password entry screen to request entry of a password. The input unit 224 receives the entry of a password from the user.

Figure 6A:
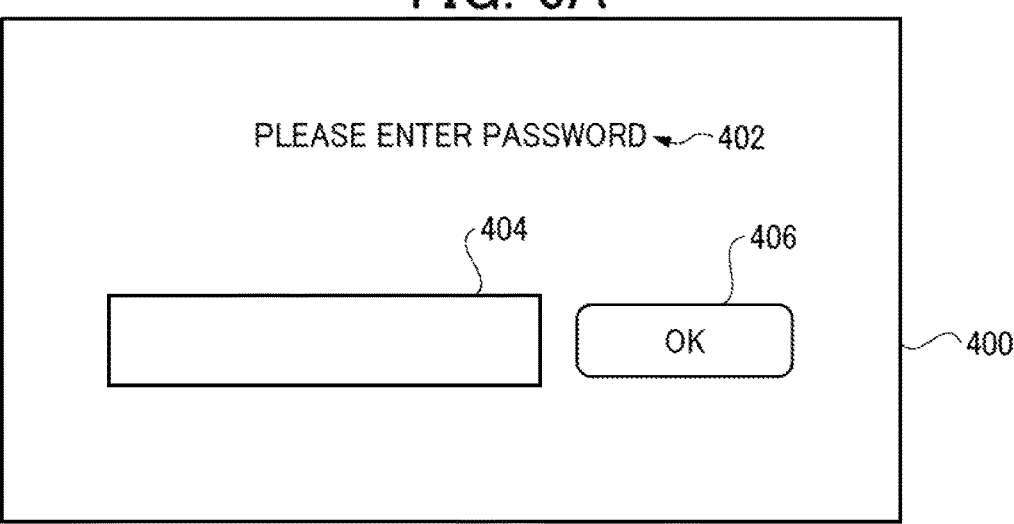
FIGS. 6A to 6C are diagrams each illustrating a password entry screen displayed on a control panel of a multifunction peripheral according to the first embodiment of the present disclosure.

FIG. 6A illustrates a password entry screen 400 displayed on, for example, the control panel 120 of the MFP 110 according to the present embodiment.

The password entry screen 400 includes a message 402 requesting entry of a password, a text box 404 that indicates a password entry state, and a key 406 that receives an instruction to complete the entry. In the present embodiment, the requesting unit 222 requests the password entry by displaying the password entry screen 400 including the message 402 as illustrated in FIG. 6A. Alternatively, the requesting unit 222 may simply display a software keyboard or numeric keypad to prompt the user to enter a password or may request the password entry by voice, instead of displaying a screen.

Referring back to FIG. 5, in step S111, the login authentication unit 212 determines whether the entered password matches a password stored in the login information storing unit 218 in association with the user ID of a candidate.

When the login authentication unit 212 determines that the entered password matches a password of any candidate (YES in step S111), the process proceeds to step S112.

In step S112, the login authentication unit 212 successfully completes the login with the user ID of the candidate whose password matches the entered password.

Subsequently, in step S113, the operation unit 220 displays the post-login screen.

On the other hand, when the login authentication unit 212 determines that the entered password does not match a password of any candidate (NO in step S111), the process proceeds to step S114.

In step S114, the login authentication unit 212 determines that the login has failed and ends the login processing illustrated in FIG. 5.

The login authentication system 100 of the above-described embodiment of the present disclosure allows the operator to log in by simply entering a password without specifying the user identification information of the operator such as the user ID when the login authentication system 100 has failed to confirm from the result of face authentication that a single user satisfies the login conditions and determines a plurality of users as candidates. In short, according to the above-described embodiment of the present disclosure, the single user can be specified by the association between the entered password and the user identification information of the candidate resulted from the face authentication. Accordingly, the security is increased while minimizing the burden of the operations of the users such as manual input of the user identification information and searching for and selecting a desired one from a plurality of candidates. In addition, the password entry for simple second authentication maintains the security. The password entry depends on the knowledge information of the operator as an alternative to the face authentication and reduces the burden of carrying an ID card. Although the face authentication has been typically introduced to reduce the burden of carrying an ID card, the users or operators still need to carry their ID cards for ID card authentication that is carried out as an alternative authentication when the face authentication fails. The password entry according to the above-described embodiment of the present disclosure reduces such burden on the users or operators.

In the above-described embodiment of the present disclosure, the operator enters the password on a password entry screen as illustrated in FIG. 6A. Alternatively, the MFP 110 may display a screen with the user information of candidates as illustrated in FIG. 6B.

Figure 6B:
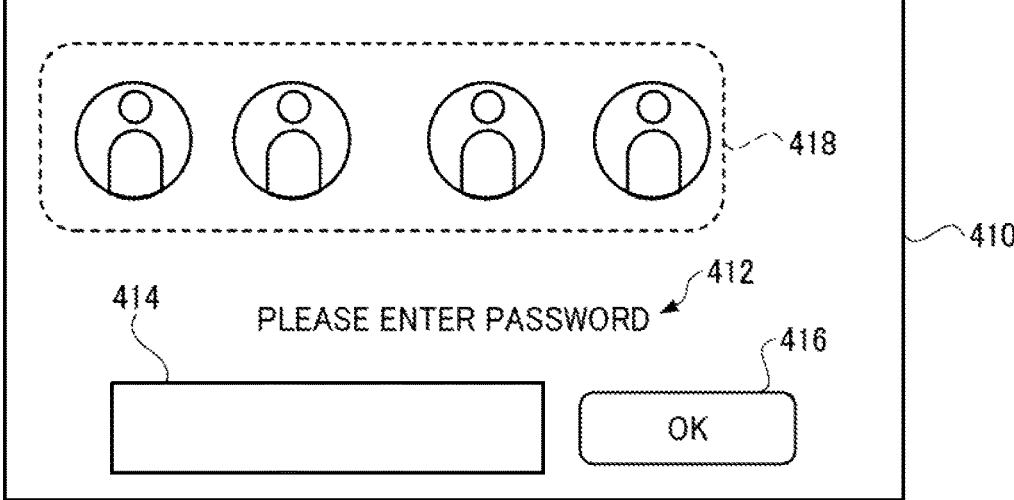

FIG. 6B illustrates a password entry screen 410 displayed on, for example, the control panel 120 of the MFP 110 according to another embodiment of the present disclosure.

The password entry screen 410 includes a message 412, a text box 414, and a key 416 like the message 402, the text box 404, and the key 406, respectively, illustrated in FIG. 6A. The password entry screen 410 further includes a user information area 418 in which a plurality of pieces of user information of candidates are arranged and displayed. Such a configuration including the user information area 418 allows the operator to ascertain whether the operator is a candidate and prevents the operator from unnecessarily entering the password when the operator is not a candidate. Thus, the convenience is enhanced. In addition to the above-described option for avoiding the hassle of specifying or selecting a user ID by password entry, a typical option may be provided that allows a user to enter the password after selecting, from the user information area 418, one of the pieces of user information selectable by, for example, a radio button.

As described above, the password authentication 310 can be performed in a simple manner with the result of the collation in the face authentication 300.

Figure 6C:
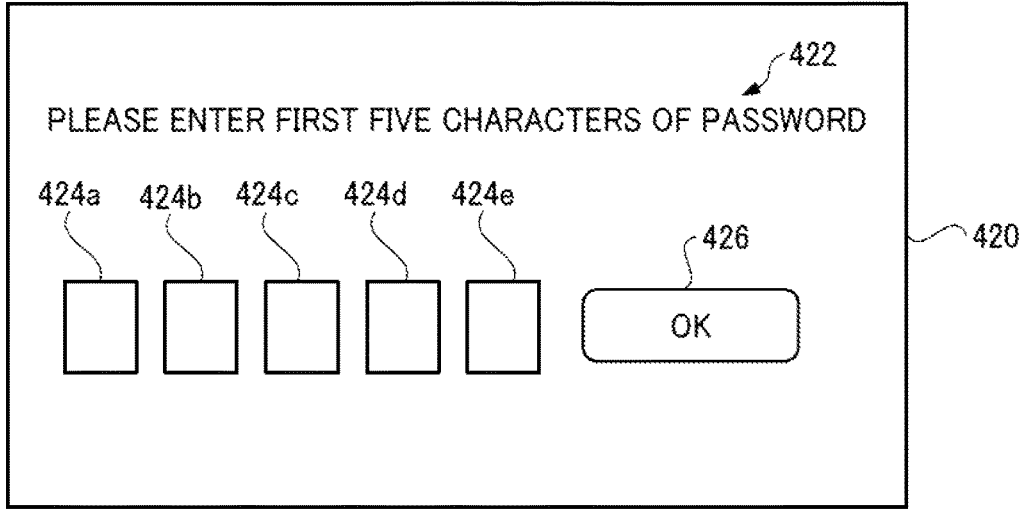
Figure 7:
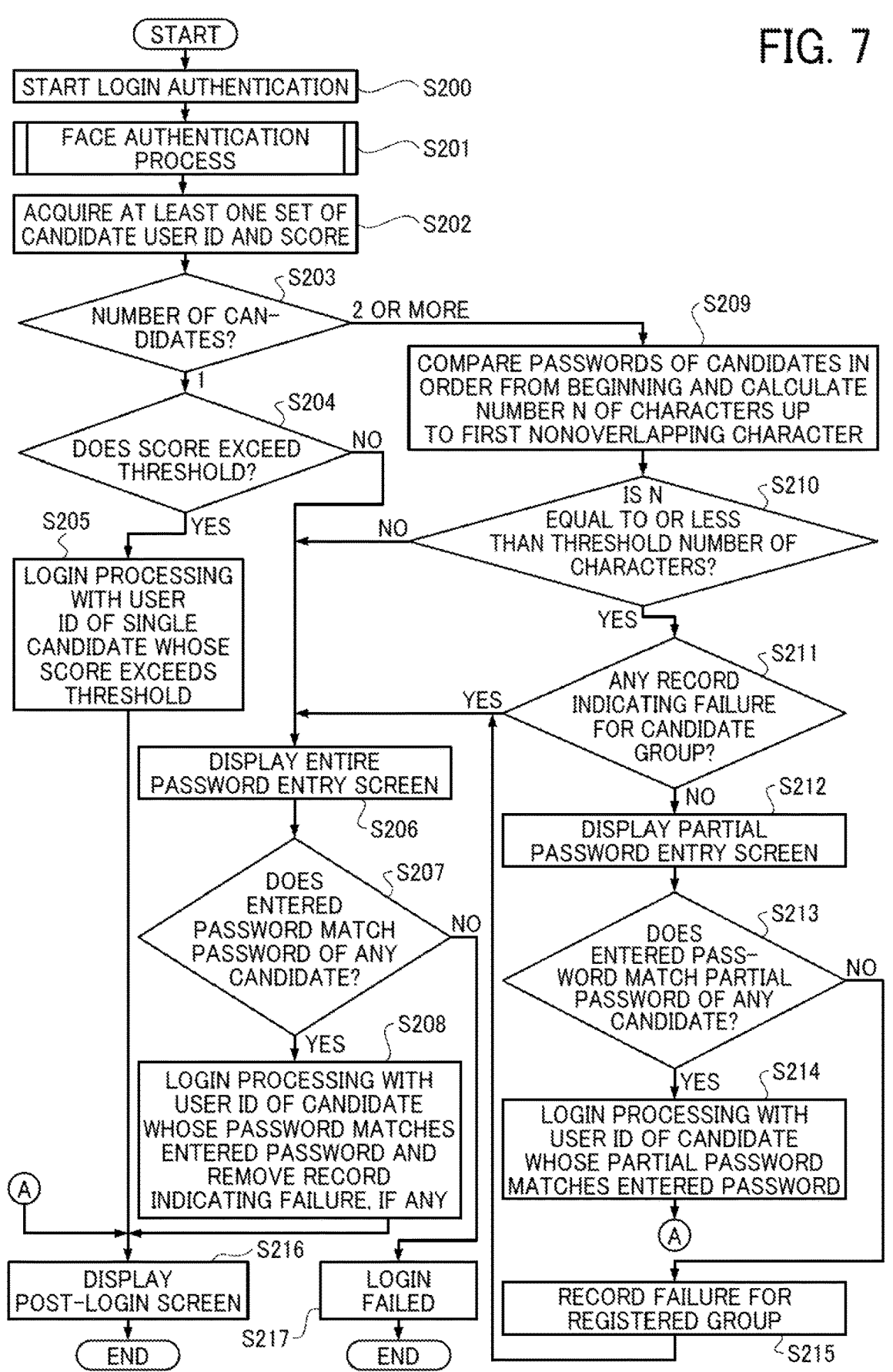
FIG. 7 is a flowchart illustrating an authentication method executed in a login authentication system according to a second embodiment of the present disclosure.

Referring to FIGS. 6C, 7, and 8, a description is given below of a second embodiment of the present disclosure.

In the second embodiment of the present disclosure, simple password authentication (password authentication in a simple manner) is selectable to reduce the hassle of the operator who enters the entire password, while ensuring security with the result of collation in the face authentication.

FIG. 7 is a flowchart illustrating an authentication method executed in the login authentication system 100 according to the second embodiment of the present disclosure.

Like the process illustrated in FIG. 5, the process illustrated in FIG. 7 starts with step S200 in response to the occurrence of an event that triggers the start of the login processing.

In step S201, the login authentication unit 212 executes a face authentication process in cooperation with the face authentication server 150. The process of step S201 illustrated in FIG. 7 corresponds to a series of operations of steps S101 to S105 illustrated in FIG. 5.

In step S202, the login authentication unit 212 acquires, through the network communication unit 216, at least one set of a user ID of a candidate and the corresponding score, as a result of collation, from the face authentication server 150.

The flow is branched in step S203 based on the number of acquired candidates. In other words, in step S203, the login authentication unit 212 determines the number of candidates.

When the login authentication unit 212 determines that the number of candidates is one (1 in step S203), the process proceeds to step S204.

Like the flow illustrated in FIG. 5, in step S204, the login authentication unit 212 determines whether the score of the user ID of the candidate exceeds the authentication threshold.

When the score of the user ID of the candidate exceeds the authentication threshold (YES in step S204), the process proceeds to step S205.

In step S205, the login authentication unit 212 completes the login processing with the user ID of the single candidate whose score exceeds the authentication threshold.

Subsequently, in step S216, the operation unit 220 displays a post-login screen.

On the other hand, when the login authentication unit 212 determines that the score of the user ID of the candidate does not exceed the authentication threshold (NO in step S204), the process proceeds to step S206.

In step S206, the requesting unit 222 displays a password entry screen as illustrated in FIG. 6A.

In step S207, the login authentication unit 212 determines whether the entered password matches a password stored in the login information storing unit 218 in association with the user ID of a candidate.

When the login authentication unit 212 determines that the entered password matches a password of any candidate (YES in step S207), in step S208, the login authentication unit 212 successfully completes the login.

Subsequently, in step S216, the operation unit 220 displays the post-login screen.

On the other hand, when the login authentication unit 212 determines that the entered password does not match a password of any candidate (NO in step S207), the process proceeds to step S217.

In step S217, the login authentication unit 212 determines that the login has failed and ends the login processing illustrated in FIG. 7.

On the other hand, when the login authentication unit 212 determines that the number of candidates is two or more (2 OR MORE in step S203), the process proceeds to step S209.

In step S209, the login authentication unit 212 reads passwords of a plurality of candidates to compare a plurality of password character strings in order from the beginning and calculate a number N of characters up to the first nonoverlapping character. The number N of characters is the minimum number of characters to specify any one of a plurality of passwords.

FIG. 8A illustrates a data structure of a table storing login information. The table may be referenced in one or more embodiments of the present disclosure.

As illustrated in FIG. 8A, the table storing login information associates face identification information (face ID), user identification information (user ID), and a password with one another.

For example, when the table storing login information includes, as candidates, two user IDs: "usera" and "userc" as illustrated in FIG. 8A, the former "1234" is an overlapping prefix portion of the password of each of the user IDs ("usera" and "userc"). The number N of characters up to the first nonoverlapping character is five. In other words, by requesting to enter the first five characters of the password, it can be specified to which user ID the password corresponds.

Referring back to FIG. 7, the flow is branched in step S210 based on the determination as to whether the number N of characters is equal to or less than a predefined threshold number of characters (for example, the minimum number of characters required for a password for authentication at the time of registration). In other words, in step S210, the login authentication unit 212 determines whether the number N of characters is equal to or less than the predefined threshold number of characters.

When the login authentication unit 212 determines that the number N of characters is greater than the predefined threshold number of characters (NO in step S210), the process proceeds to step S206 to request entry of the entire password.

On the other hand, when the login authentication unit 212 determines that the number N of characters is equal to or less than the predefined threshold number of characters (YES in step S210), the process proceeds to step S211.

In step S211, the login authentication unit 212 determines whether any record indicating a failure of an attempt of simple password authentication in the past exists for the group of two or more candidates (candidate group).

When the login authentication unit 212 determines that such a record indicating the failure exists (YES in step S211), the process proceeds to step S206.

On the other hand, when the login authentication unit 212 determines that no record indicating the failure exists (NO in step S211), the process proceeds to step S212 to request entry of the partial password.

In step S212, the requesting unit 222 displays a simple or partial password entry screen to request entry of a partial password. The input unit 224 receives the entry of the partial password from the user.

FIG. 6C illustrates a simple password entry screen 420 displayed on, for example, the control panel 120 of the MFP 110 according to the second embodiment of the present disclosure.

The simple password entry screen 420 includes a message 422 requesting entry of a predetermined number of characters from the beginning of the password, a group of text boxes 424a to 424e that indicates a password entry state, and a key 426 that receives an instruction to complete the entry. In the simple password authentication, the requesting unit 222 requests to enter a part of the password (partial password) including at least the predetermined number N of characters from the beginning. The partial password may be a part corresponding to the predetermined number N of characters from the beginning or may be a part longer than the shortest character string (the predetermined number N of characters) and shorter than the entire character string (for example, N+2 characters from the beginning).

Referring back to FIG. 7, in step S213, the login authentication unit 212 determines whether the entered password matches a partial password stored in the login information storing unit 218 in association with the user ID of a candidate.

When the login authentication unit 212 determines that the entered password matches a partial password of any candidate (YES in step S213), in step S214, the login authentication unit 212 successfully completes the login with the user ID of the candidate whose partial password matches the entered password. Then, the process proceeds to step S216 via (A).

In step S216, the operation unit 220 displays the post-login screen.

On the other hand, when the login authentication unit 212 determines that the entered password does not match a partial password of any candidate (NO in step S213), the process proceeds to step S215.

In step S215, the login authentication unit 212 records a login failure for the current group of two or more candidates as a candidate group. The process then proceeds to step S206 to change the password authentication from the simple password authentication to the entire password authentication that requests to enter the entire password.

FIG. 8B illustrates a data structure of a table indicating candidate groups for which login failure is recorded. The table may be referenced in the second embodiment of the present disclosure.

As illustrated in FIG. 8B, when the simple password authentication fails, an identifier (group ID) is assigned to each group of a plurality of candidates to identify individual groups. A set of user IDs of candidates belonging to the group is recorded as a candidate group. The record indicating the failure remains until the correct password is entered in response to the request for entry of the entire password, resulting in successful login, for the same candidate group. When the login authentication unit 212 determines that the entered password matches a password of any candidate (YES in step S207) after proceeding to the entire password authentication, in step S208, the login authentication unit 212 successfully completes the login and deletes the record indicating the failure for the candidate group.

In other words, when the simple password authentication fails once and the subsequent entire password authentication is successful, the simple password authentication is no longer restricted. By contrast, when the simple password authentication fails once and the subsequent entire password authentication also fails, the simple password authentication is restricted or prohibited for the same candidate group unless the entire password authentication succeeds once. Accordingly, brute force attacks are prevented.

According to the second embodiment of the present disclosure, security is maintained while avoiding the hassle of entering the entire password when a plurality of candidates are found as a result of face authentication.

In the embodiment described above, when the number of candidates is two or more, the simple password authentication is permitted regardless of the score in the face authentication. On the other hand, the security for simple password authentication may be preferably increased.

Figure 9:
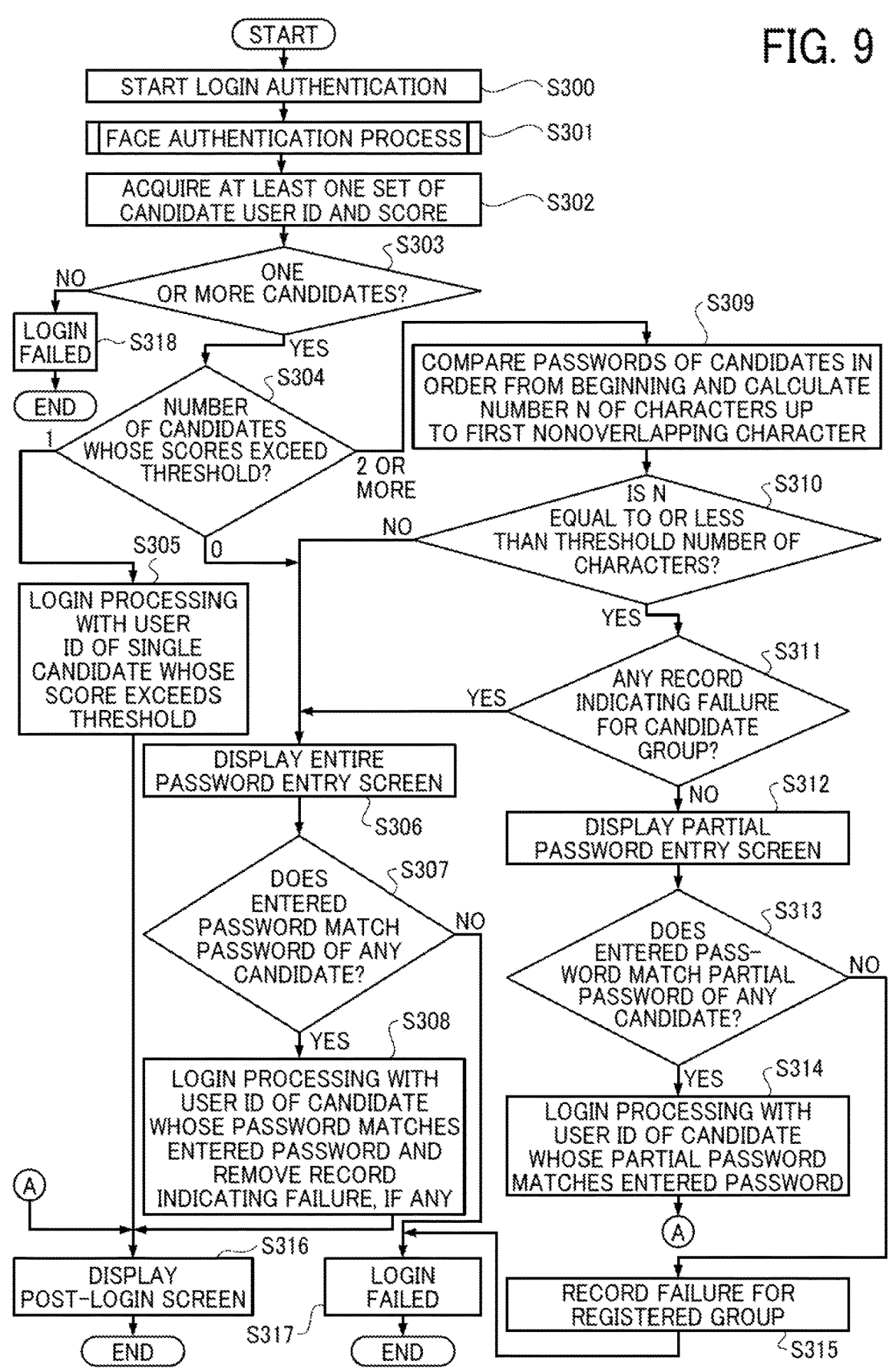
FIG. 9 is a flowchart illustrating an authentication method executed in a login authentication system according to a third embodiment of the present disclosure.

Referring to FIG. 9, a description is given below of a third embodiment of the present disclosure.

In the third embodiment of the present disclosure, the simple password authentication is permitted only for candidates whose scores exceed the authentication threshold and allow successful authentication with the individual scores.

FIG. 9 is a flowchart illustrating an authentication method executed in the login authentication system 100 according to the third embodiment of the present disclosure.

Like the processes illustrated in FIGS. 5 and 7, the process illustrated in FIG. 9 starts with step S300 in response to the occurrence of an event that triggers the start of the login processing.

The operations of steps S301 and S302 are respectively the same as the operations of steps S201 and S202 illustrated in FIG. 7.

The flow is branched in step S303 based on the determination as to whether the number of acquired candidates is one or more. In other words, in step S303, the login authentication unit 212 determines the number of acquired candidates.

When the login authentication unit 212 determines that the number of acquired candidates is zero (NO in step S303), the process proceeds to step S318.

In step S318, the login authentication unit 212 determines that the login has failed and ends the login processing illustrated in FIG. 9.

On the other hand, when the login authentication unit 212 determines that the number of acquired candidates is one or more (YES in step S303), the process proceeds to step S304.

In step S304, the login authentication unit 212 determines the number of candidates whose scores exceed a threshold. Specifically, in step S304, the login authentication unit 212 compares the score of each of the candidates with the authentication threshold to obtain the number of candidates whose scores exceed the authentication threshold. The flow is branched in step S304 based on the number of candidates whose scores exceed the authentication threshold.

When the login authentication unit 212 determines that the number of candidates whose scores exceed the authentication threshold is one (1 in step S304), the process proceeds to step S305.

In step S305, the login authentication unit 212 completes the login processing with the user ID of the single candidate whose score exceeds the authentication threshold.

Subsequently, in step S316, the operation unit 220 displays a post-login screen.

When the login authentication unit 212 determines that the number of candidates whose scores exceed the authentication threshold is zero (0 in step S304), the process proceeds to step S306.

In step S306, the requesting unit 222 displays a password entry screen as illustrated in FIG. 6A.

In step S307, the login authentication unit 212 determines whether the entered password matches a password stored in the login information storing unit 218 in association with the user ID of any candidate whose score does not exceed the authentication threshold.

When the login authentication unit 212 determines that the entered password matches a password of any candidate (YES in step S307), in step S308, the login authentication unit 212 successfully completes the login and removes a record indicating a failure, if any.

Subsequently, in step S316, the operation unit 220 displays the post-login screen.

On the other hand, when the login authentication unit 212 determines that the entered password does not match a password of any candidate (NO in step S307), the process proceeds to step S317.

In step S317, the login authentication unit 212 determines that the login has failed and ends the login processing illustrated in FIG. 9.

When the login authentication unit 212 determines that the number of candidates whose scores exceed the authentication threshold is two or more (2 OR MORE in step S304), the process proceeds to step S309.

The operations of steps S309 to S315 are respectively the same as the operations of steps S209 to S215 in the second embodiment described above with reference to FIG. 7. Depending on the conditions, the simple password authentication may be performed with the simple password entry screen 420 illustrated in FIG. 6C.

In the third embodiment of the present disclosure, candidates who satisfy the conditions for successful authentication when the scores of the candidates are individually identified are allowed to log in by entering a partial password. Accordingly, the security is further increased.

In the above-described embodiments of the present disclosure, the password entry is requested in the password authentication following the face authentication. When any one of a plurality of candidates is identified by the face authentication, processing other than processing requiring a specific authority may be permitted.

Figure 10:
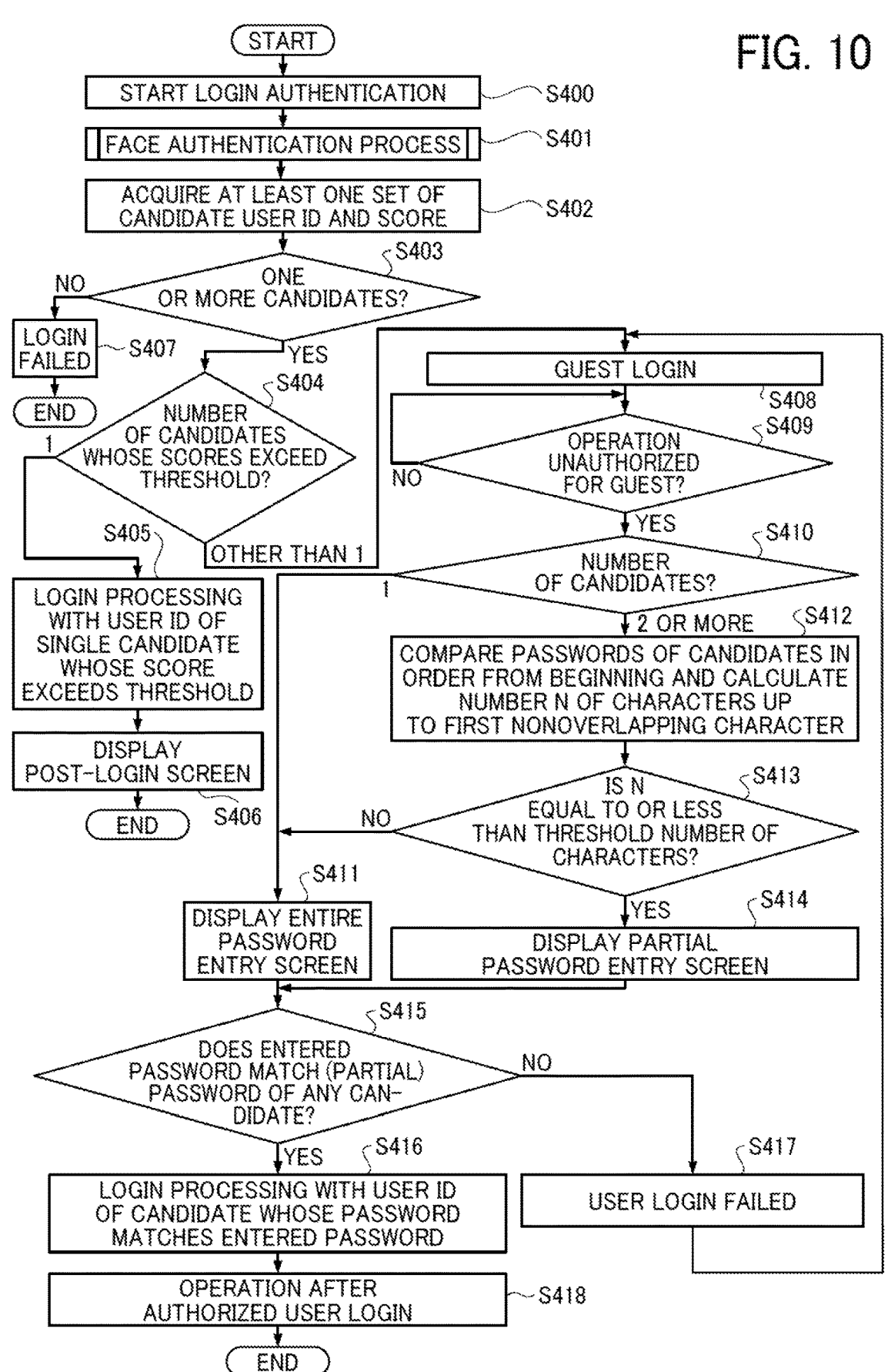
FIG. 10 is a flowchart illustrating an authentication method executed in a login authentication system according to a fourth embodiment of the present disclosure.

Referring to FIG. 10, a description is given below of a fourth embodiment of the present disclosure.

In the fourth embodiment of the present disclosure, a user is allowed to log in as a guest user when a plurality of candidates are identified by the face authentication but the single user fails to be identified.

FIG. 10 is a flowchart illustrating an authentication method executed in the login authentication system 100 according to the fourth embodiment of the present disclosure.

Like the processes illustrated in FIGS. 5, 7, and 9, the process illustrated in FIG. 10 starts with step S400 in response to the occurrence of an event that triggers the start of the login processing.

The operations of steps S401 to S405, S406, and S407 are respectively the same as the operations of steps S301 to S305, S316, and S318 illustrated in FIG. 9.

When the login authentication unit 212 determines that the number of candidates whose scores exceed the authentication threshold is zero or two or more (OTHER THAN 1 in step S404), the process proceeds to step S408.

In step S408, the login authentication unit 212 permits an operator P (i.e., the person P to be authenticated) to log in as a guest user. The operator P can execute subsequent operations other than operations permitted only to a specific user. Examples of operations permitted only to a specific user include, but are not limited to, operations related to the privacy of the specific user and requiring access to user data and operations permitted only to an administrator user.

In step S409, the login authentication unit 212 determines whether an operation outside the authority of the guest user is performed.

When the login authentication unit 212 determines that no operation outside the authority of the guest user is performed (NO in step S409), the login authentication unit 212 repeats the determination in step S409. In other words, the login authentication unit 212 waits until an operation outside the authority of the guest user is performed.

When the guest login stays idle for a certain period of time, the guest login may be canceled to return to a standby state.

On the other hand, when the login authentication unit 212 determines that an operation outside the authority of the guest user is performed (YES in step S409), the login processing proceeds to specific user login processing. The process proceeds to step S410.

The flow is branched in step S410 based on the number of candidates acquired as a result of face authentication at the time of guest login. In other words, in step S410, the login authentication unit 212 determines the number of candidates.

When the login authentication unit 212 determines that the number of candidates is one (1 in step S410), the process proceeds to step S411.

In step S411, the requesting unit 222 displays a screen for requesting to enter the entire password as illustrated in FIG. 6A.

On the other hand, when the login authentication unit 212 determines that the number of candidates is two or more (2 OR MORE in step S410), the process proceeds to step S412.

In step S412, the login authentication unit 212 obtains the number N of characters from the beginning as described above.

The flow is branched in step S413 based on the determination as to whether the number N of characters is equal to or less than the predetermined threshold number of characters. In other words, in step S413, the login authentication unit 212 determines whether the number N of characters is equal to or less than the predetermined threshold number of characters.

When the login authentication unit 212 determines that the number N of characters is not equal to or less than the predetermined threshold number of characters (NO in step S413), in step S411, the requesting unit 222 displays the screen for requesting to enter the entire password as illustrated in FIG. 6A.

On the other hand, when the login authentication unit 212 determines that the number N of characters is equal to or less than the predetermined threshold number of characters (YES in step S413), in step S414, the requesting unit 222 displays a screen for requesting to enter the partial password as illustrated in FIG. 6C.

In step S415, the login authentication unit 212 determines whether the entire password entered on the password entry screen in step S411 matches an entire password of any candidate or whether the partial password entered on the password entry screen in step S414 matches a partial password of any candidate.

When the login authentication unit 212 determines that the entire password entered on the password entry screen in step S411 matches an entire password of any candidate or that the partial password entered on the password entry screen in step S414 matches a partial password of any candidate (YES in step S415), in step S416, the login authentication unit 212 completes the login processing with the user ID of the candidate whose entire or partial password matches the entered password.

In step S418, the process proceeds to an operation after authorized user login.

On the other hand, when the login authentication unit 212 determines that the entire password entered on the password entry screen in step S411 does not match an entire password of any candidate or that the partial password entered on the password entry screen in step S414 does not match a partial password of any candidate (NO in step S415), the process proceeds to step S417.

In step S417, the login authentication unit 212 causes the login by the specific user to fail.

The process then returns to, for example, step S408, to maintain the guest user login.

According to the fourth embodiment of the present disclosure, when a plurality of candidates are found as a result of face authentication, authentication is once performed as a guest user. The authentication of the person P to be authenticated by password entry is deferred until an operation limited to a specific user occurs. Accordingly, when the operator fails to satisfy login conditions in the face authentication that is easily affected by the environment such as the brightness, the operator can still use, for example, the functions that do not involve access to personal data. Thus, the convenience is enhanced. On the other hand, for the functions limited only to a specific user involving access to personal data, the operator can log in again as a correct user by a simple operation before executing the functions.

In the above embodiments of the present disclosure, the password authentication (including simple authentication) has been described as an alternative authentication scheme of the face authentication. When the result of face authentication is insufficient to determine that the face authentication is successful, the result of face authentication may still have a certain degree and range of certainty. The security level to be determined varies depending on the administrator of the MFP 110.

A description is given below of the setting of the above-described alternative authentication.

Figure 11A:
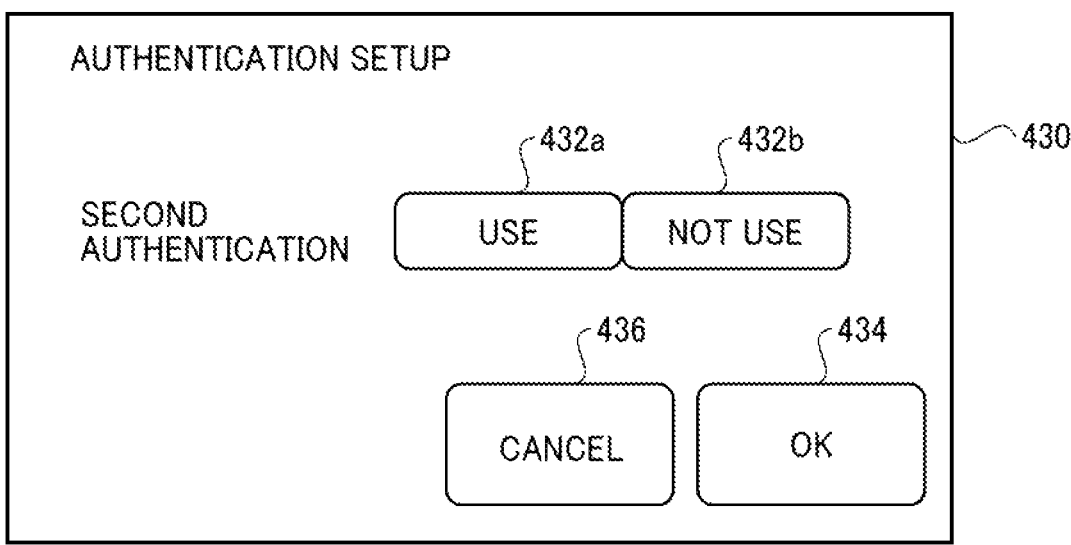
FIG. 11A is a diagram illustrating a setup screen related to alternate authentication according to one or more embodiments of the present disclosure.
Figure 11B:
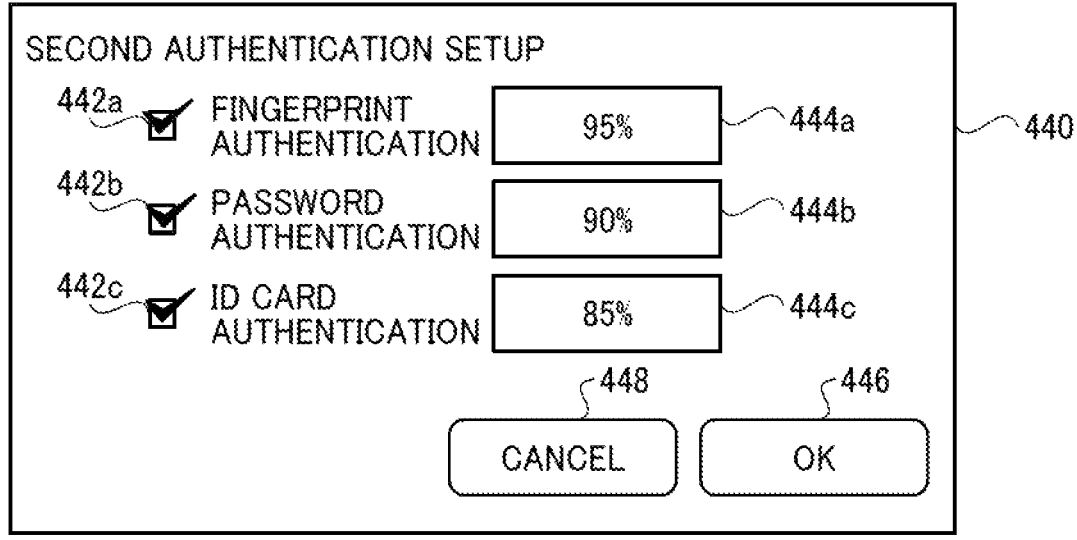
FIG. 11B is a diagram illustrating a setup screen displayed when the alternate authentication is enabled on the setup screen of FIG. 11A.

Each of FIGS. 11A and 11B illustrates a setup screen related to the above-described alternative authentication.

Specifically, FIG. 11A illustrates a setup screen for enabling or disabling alternative authentication. A setup screen 430 illustrated in FIG. 11A includes radio buttons 432a and 432b for designating whether to use alternative authentication (second authentication), an OK key 434, and a cancel key 436. In the following description, the radio buttons 432a and 432b may be referred to as a "use" key 432a and a "not use" key 432b, respectively. When the "use" key 432a is selected and the OK key 434 is pressed, the alternative authentication is enabled.

FIG. 11B illustrates a setup screen for designating the alternative authentication scheme in association with the score of the face authentication when the alternative authentication is enabled.

A setup screen 440 includes checkboxes 442a to 442c for enabling a predetermined scheme as alternative authentication, text boxes 444a to 444c for inputting a threshold for the score of the face authentication for each authentication, an OK key 446, and a cancel key 448. In this example, the selected alternative authentication is requested when the score is equal to or less than the input threshold (percentage). In FIG. 11B, the checkboxes 442a, 442b, and 442c correspond to fingerprint authentication, password authentication, and ID card authentication, respectively, as authentication schemes. When the OK key 446 is pressed with the checkbox 442b corresponding to the password authentication checked, the password authentication (including simple authentication) is enabled as alternative authentication according to the present embodiment.

The range of scores of the face authentication, in which the password authentication (including simple password authentication) is performed as alternative authentication, is determined based on the settings of the checkboxes 442a to 442c and the text boxes 444a to 444c. For example, when the threshold serving as a login condition for the face authentication is 95% and the threshold for selecting a candidate in the face authentication is 70%, and when the thresholds for the fingerprint authentication, the password authentication, and the ID card authentication are set to 95%, 90%, and 85%, respectively, as illustrated in FIG. 11B, the login processing is executed without alternative authentication, with the score of the face authentication greater than 95%. The fingerprint authentication is executed with the score of the face authentication in a range of 90% to 95%. The above-described password authentication according to the present disclosure is executed with the score of the face authentication in a range of 85% to 90%. The ID card authentication is executed with the score of the face authentication in a range of 70% to 85%. Login is disabled with the score of the face authentication equal to or less than 70%.

FIG. 12 is a flowchart illustrating an authentication method executed in the login authentication system 100 according to the fifth embodiment of the present disclosure.

In the authentication method illustrated in FIG. 12, the alternative authentication is changed based on the settings on the setup screens illustrated in FIGS. 11A and 11B.

Like the processes illustrated in FIGS. 5, 7, 9, and 10, the process illustrated in FIG. 12 starts with step S500 in response to the occurrence of an event that triggers the start of the login processing.

The operations of steps S501 to S505, and S510 are respectively the same as the operations of steps S201 to S205, and S216 illustrated in FIG. 7.

When the login authentication unit 212 determines that the number of candidates is two or more (2 OR MORE in step S503), or when the login authentication unit 212 determines that the score of the user ID of the candidate does not exceed the authentication threshold (NO in step S504), the process proceeds to step S506.

In step S506, the login authentication unit 212 determines whether the second authentication is password authentication, based on the range to which the score of the candidate falls. When the number of candidates is two or more, for example, the determination may be made based on a range to which the highest score of the scores of the two or more candidates falls. For example, in a case where the score of the face authentication is outside the range of 85% to 90% in the above example, the login authentication unit 212 determines that the second authentication is not password authentication (NO in step S506). The process then proceeds to step S512.

In this case, in step S512, the login authentication unit 212 executes authentication processing with the second authentication scheme (for example, the fingerprint authentication or the ID card authentication) other than the password authentication.

On the other hand, in a case where the score of the face authentication is in the range of 85% to 90% in the above example, the login authentication unit 212 determines that the password authentication is selected as the second authentication (YES in step S506). The process then proceeds to step S507.

The operations of steps S507 to S509, and S511 are respectively the same as the operations of steps S110 to S112, and S114 illustrated in FIG. 5.

According to the fifth embodiment of the present disclosure, the user can select the security level necessary for the alternative authentication based on the reliability of the personal authentication in the face authentication. Thus, the user can determine the balance between the convenience and the safety.

In the above embodiments of the present disclosure, the login authentication system 100 that executes login authentication to the MFP 110 has been described. However, a target to which the authentication method including both the face authentication and the password authentication according to the embodiments of the present disclosure can be applied is not limited to the login authentication to the MFP 110. For example, the authentication method may be applied to login processing to another system or apparatus, or authentication of a passerby in a system that controls opening/closing or locking/unlocking of an entrance to a building or a room.

Figure 13:
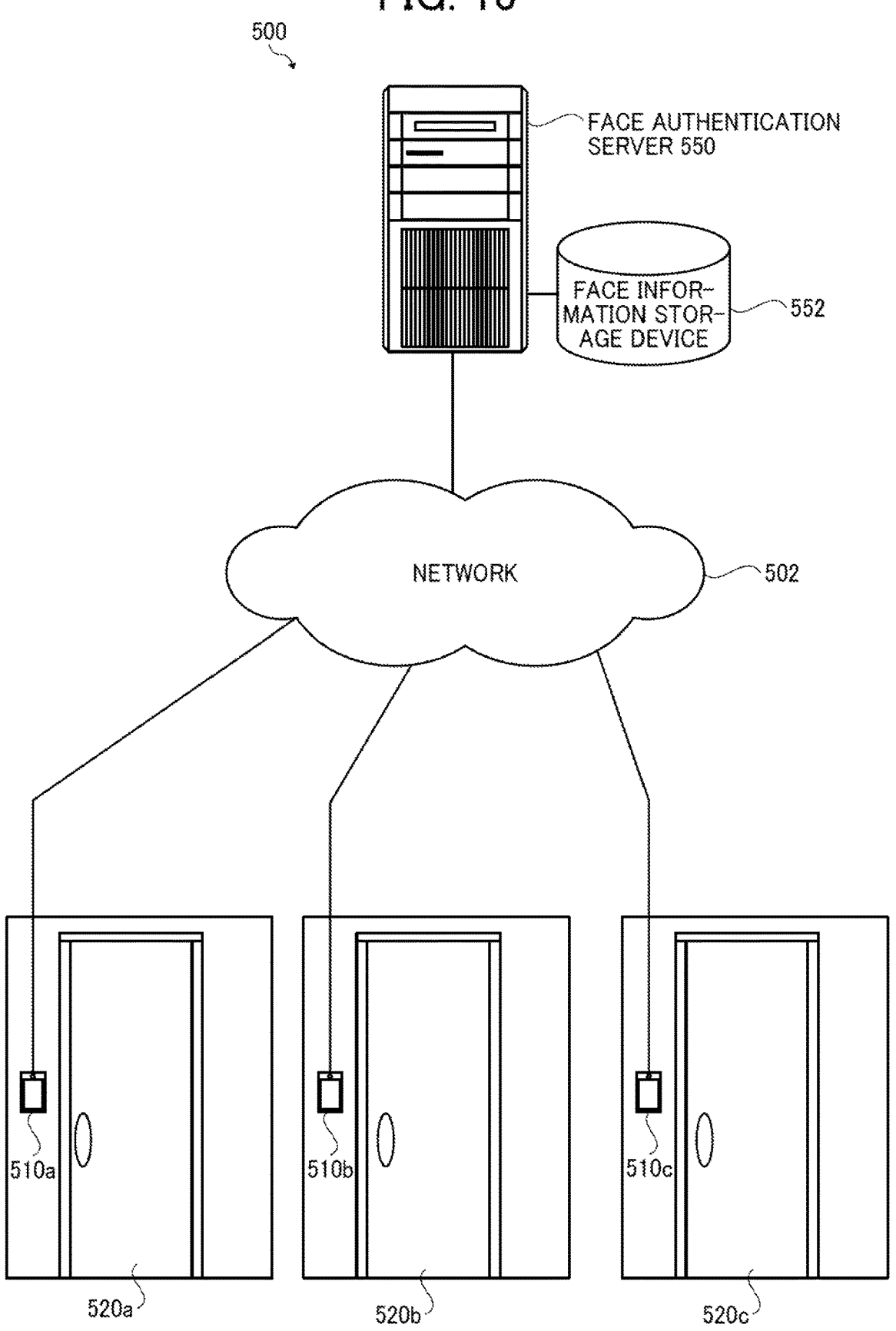
FIG. 13 is a schematic diagram illustrating an access authentication system according to an alternative embodiment of the present disclosure.

FIG. 13 is a diagram illustrating the overall configuration of an access authentication system 500 according to an alternative embodiment of the present disclosure.

As illustrated in FIG. 13, the access authentication system 500 includes a face authentication server 550 that executes face authentication and three camera-equipped door terminals 510a to 510c respectively installed on walls near room doors 520a to 520c.

Each of the door terminals 510a to 510c is an information processing apparatus through which users are authenticated to enter the room. The door terminals 510a to 510c are connected to the face authentication server 550 via a network 502. The door terminals 510 (510a to 510c) support face authentication and communicate with the face authentication server 550 at the time of face authentication. According to the present embodiment, each of the door terminals 510 is a terminal apparatus to be approached and operated by a person to be authenticated at the time of authentication and serves as an information processing apparatus that provides a function (locking/unlocking function) that the person to be authenticated intends to use.

Each of the door terminals 510a to 510c has a built-in camera and is used for face authentication when the users enter the room. The face authentication server 550 includes a face information storage device 552 that stores face information (face images or face feature information) of a plurality of users registered in advance. In response to a face authentication request from the outside (for example, the door terminal 510), the face authentication server 550 compares and collates the face information of an authentication target related to the request, with each piece of face information registered in advance. The face authentication server 550 transmits the result of collation of the face information as a response to the request. When the authentication of the user (i.e., the person who intends to enter the room) is not successful with a predetermined certainty in the face authentication, the door terminal 510 executes the above-described password authentication after the face authentication.

As described above, according to the above embodiments of the present disclosure, an information processing system is provided to execute simple alternative authentication so that the user does not have to search or select a desired one from a plurality of candidates found as a result of the collation of face information, and maintain a certain level of security. Also provided are an information processing apparatus of the information processing system, a method executed by the information processing system, and a non-transitory recording medium storing a plurality of instructions which, when executed by one or more processors, causes the processors to perform the method.

When users remain as candidates as a result of the collation of face information, the above-described configuration provides simple alternative authentication so that the user does not have to search or select a desired one from the candidates, to maintain a certain level of security.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing system comprising circuitry configured to:

collate authentication target face information with registered target face information to generate a collation result, the authentication target face information being acquired by reading target face information of a person to be authenticated, the registered target face information having been registered in advance in association with identification information;

in a case where a plurality of pieces of identification information are found based on the collation result indicating a plurality of pieces of registered target face information satisfying a predetermined authentication condition, the plurality of pieces of identification information of the identification information being associated with the plurality of pieces of registered target face information of the registered target face information, request entry of alternative authentication information; and authenticate the person to be authenticated, based on entered alternative authentication information and a plurality of pieces of alternative authentication registration information, the plurality of pieces of alternative authentication registration information being stored in association with the plurality of pieces of identification information.

2. The information processing system according to claim 1, wherein the predetermined authentication condition is satisfied when a degree of coincidence between the authentication target face information and the registered target face information exceeds a predetermined threshold.

3. The information processing system according to claim 2, wherein the predetermined threshold is a threshold for determining a candidate of corresponding identification information corresponding to the person to be authenticated, and wherein the circuitry is configured to determine, as the candidate, the identification information corresponding to the registered target face information coincident with the authentication target face information by a degree exceeding the threshold.

4. The information processing system according to claim 2, wherein the predetermined threshold is a threshold for determining that authentication is successful, and wherein the circuitry is configured to:

determine the identification information corresponding to the registered target face information coincident with the authentication target face information by a degree exceeding the threshold, as corresponding identification information corresponding to the person to be authenticated; and determine that authentication is successful with the corresponding identification information.

5. The information processing system according to claim 1, wherein the circuitry is configured to:

identify, based on the entered alternative authentication information and the plurality of pieces of alternative authentication registration information, single identification information of the plurality of pieces of identification information as corresponding identification information corresponding to the person to be authenticated; and determine whether to authenticate with the identified corresponding identification information, based on the entered alternative authentication information.

6. The information processing system according to claim 1, wherein, in a case where single identification information is found based on the collation result, the single identification information corresponding to single registered target face information having a degree of coincidence with the authentication target face information exceeding a threshold for determining that authentication is successful, the circuitry is configured to successfully complete authentication with the single identification information, the single identification information being corresponding identification information corresponding to the person to be authenticated.

7. The information processing system according to claim 1, wherein, in a case where single identification information is found based on the collation result, the single identification information corresponding to single registered target face information having a degree of coincidence with the authentication target face information exceeding a threshold for determining candidate but not exceeding by a threshold for determining that authentication is successful, the circuitry is configured to:

request entry of the alternative authentication information; and determine whether to authenticate with the single identification information, based on the entered alternative authentication information, the single identification information being corresponding identification information corresponding to the person to be authenticated.

8. The information processing system according to claim 1, wherein, in a case where the plurality of pieces of identification information are found based on the collation result indicating the plurality of pieces of registered target face information satisfying the predetermined authentication condition, the circuitry is configured to temporarily authenticate the person to be authenticated as a guest user and defer requesting entry of the alternative authentication information and authenticating the person to be authenticated until an operation limited to a specific user occurs.

9. The information processing system according to claim 1, wherein, in a case where authentication is not successful based on the collation result alone, the circuitry is configured to:

receive association of an authentication scheme used in alternative authentication with a range of degrees of coincidence between the authentication target face information and the registered target face information, wherein the authentication scheme used in the alternative authentication is entry of at least partial password, and wherein the predetermined authentication condition indicates that the at least partial password is within the associated range of degrees of coincidence.

10. The information processing system according to claim 1, wherein the circuitry is configured to display, on a display, the found plurality of identification information when requesting entry of the alternative authentication information.

11. The information processing system according to claim 1, wherein the alternative authentication information is password information.

12. The information processing system according to claim 1, wherein the alternative authentication information is a part of an entire password or the entire password.

13. The information processing system according to claim 11, wherein the plurality of pieces of alternative authentication registration information are a plurality of pieces of password registration information, and wherein the circuitry is configured to:

compare characters of the password registration information between the plurality of pieces of password registration information, character by character from the beginning, to determine a predetermined number of characters up to a first nonoverlapping character;

in a case where the predetermined number of characters is equal to or less than a predefined threshold number of characters, request entry of a partial password including at least the predetermined number of characters from the beginning; and in a case where the predetermined number of characters is greater than the threshold number of characters, request entry of an entire password.

14. The information processing system according to claim 13, wherein, in a case where an error is found in the entered password information that is entered in response to the request for the entry of the partial password, the circuitry is configured to:

store, as an authentication failure group, the found plurality of pieces of identification information; and restrict authentication of the authentication failure group with the entry of the partial password until the authentication with the entry of the entire password succeeds at least once.

15. An information processing apparatus comprising circuitry configured to:

acquire a result of collation between authentication target face information and registered target face information, the authentication target face information being acquired by reading target face information of an person to be authenticated, the registered target face information having been registered in advance in association with identification information;

in a case where a plurality of pieces of identification information are found based on the result of collation indicating a plurality of pieces of registered target face information satisfying a predetermined authentication condition, the plurality of pieces of identification information of the identification information being associated with the plurality of pieces of registered target face information of the registered target face information, request entry of alternative authentication information; and authenticate the person to be authenticated, based on entered alternative authentication information and a plurality of pieces of alternative authentication registration information, the plurality of pieces of alternative authentication registration information being stored in association with the plurality of pieces of identification information.

16. An image forming apparatus comprising the information processing apparatus according to claim 15, wherein the circuitry is further configured to:

provide at least one function related to an image; and authenticate the person to be authenticated as login processing for use of the at least one function.

17. An authenticating method, comprising:

collating authentication target face information with registered target face information to generate a collation result, the authentication target face information being acquired by reading target face information of an person to be authenticated, the registered target face information having been registered in advance in association with identification information;

in a case where a plurality of pieces of identification information are found based on the collation result indicating a plurality of pieces of registered target face information satisfying a predetermined authentication condition, the plurality of pieces of identification information of the identification information being associated with the plurality of pieces of registered target face information of the registered target face information, requesting entry of alternative authentication information; and authenticating the person to be authenticated, based on entered alternative authentication information and a plurality of pieces of alternative authentication registration information, the plurality of pieces of alternative authentication registration information being stored in association with the plurality of pieces of identification information.

18. A non-transitory recording medium storing a plurality of instructions which, when executed by one or more processors, cause the one or more processors to perform the authenticating method according to claim 17.

* * * * *